US012229822B2

(12) United States Patent
Cardelino et al.

(10) Patent No.: US 12,229,822 B2
(45) Date of Patent: Feb. 18, 2025

(54) METHODS AND SYSTEM FOR INITIATING A VIRTUAL TRY-ON APPLICATION RUNNING ON A COMPUTER SYSTEM AND PROVIDING INTERACTIVE AUGMENTED REALITY (AR) GRAPHICS

(71) Applicant: Ulta Salon, Cosmetics & Fragrance, Inc., Bolingbrook, IL (US)

(72) Inventors: Juan Cardelino, Montevideo (UY); Agustina Sartori, Bolingbrook, IL (US); Javier Camacho, Montevideo (UY); Juan Pablo Boero, Bolingbrook, IL (US)

(73) Assignee: Ulta Salon, Cosmetics & Fragrance, Inc., Bolingbrook, IL (US)

( * ) Notice: Subject to any disclaimer, the term of this patent is extended or adjusted under 35 U.S.C. 154(b) by 266 days.

(21) Appl. No.: 17/839,644

(22) Filed: Jun. 14, 2022

(65) Prior Publication Data
US 2023/0401632 A1    Dec. 14, 2023

(51) Int. Cl.
*G06Q 30/0601* (2023.01)
*A45D 44/00* (2006.01)
(Continued)

(52) U.S. Cl.
CPC ....... *G06Q 30/0643* (2013.01); *A45D 44/005* (2013.01); *G06Q 30/0261* (2013.01);
(Continued)

(58) Field of Classification Search
USPC .............................................. 705/26.1–27.2
See application file for complete search history.

(56) References Cited

U.S. PATENT DOCUMENTS 9,449,412 B1 *   9/2016  Rogers ............... G06V 10/7557
10,936,175 B2 *  3/2021  Chou .................... G06F 3/0482
(Continued)

OTHER PUBLICATIONS

Daily makeover disrupts beauty industry traditions with next generation virtual try-on technology. (Aug. 24, 2009). Business Wire Retrieved from https://dialog.proquest.com/professional/docview/1061454486?accountid=131444 (Year: 2009).*

*Primary Examiner* — Jeffrey A. Smith
*Assistant Examiner* — Ashley D Preston
(74) *Attorney, Agent, or Firm* — McDonnell Boehnen Hulbert & Berghoff LLP

(57) ABSTRACT

An example method includes receiving merchandise information, and in response, initiating a virtual try-on application running on the computing device to simulate physical application of a real-world product corresponding to the merchandise information onto a portion of a user depicted in visual media. Another example method includes in response to receiving the merchandise information, retrieving an interactive graphical representation of information related to the merchandise information, providing for display an AR graphic overlaid onto a live view within a GUI of the computing device, for a topic of a selected item of the AR graphic, accessing via an AI engine data sources to identify retail information that is both (i) related to the merchandise information and (ii) determined to be related to information in a user profile, and dynamically modifying content and animation of the AR graphic to customize the AR graphic for the user.

25 Claims, 12 Drawing Sheets

(51) Int. Cl.
*G06Q 30/0251* (2023.01)
*G06T 19/00* (2011.01)
*G06T 19/20* (2011.01)
*G06V 20/20* (2022.01)
*G06V 20/64* (2022.01)
*G06V 40/16* (2022.01)

(52) U.S. Cl.
CPC ..... *G06Q 30/0271* (2013.01); *G06Q 30/0623* (2013.01); *G06T 19/006* (2013.01); *G06T 19/20* (2013.01); *G06V 20/20* (2022.01); *G06V 20/64* (2022.01); *G06V 40/161* (2022.01); *G06T 2219/2012* (2013.01)

(56) References Cited

U.S. PATENT DOCUMENTS

| | | | |
|---|---|---|---|
| 11,120,495 B2 | 9/2021 | Sartori Odizzio et al. | |
| 11,315,173 B2 | 4/2022 | Sartori Odizzio et al. | |
| 2012/0123910 A1* | 5/2012 | George | G06Q 30/0641 709/219 |
| 2018/0075524 A1* | 3/2018 | Sartori Odizzio | G06T 11/001 |
| 2021/0312533 A1* | 10/2021 | Luo | G06Q 20/208 |
| 2022/0101404 A1* | 3/2022 | Boscolo | G06Q 30/0643 |
| 2023/0306451 A1* | 9/2023 | Chaubard | G06Q 30/0202 |

\* cited by examiner

METHODS AND SYSTEM FOR INITIATING A VIRTUAL TRY-ON APPLICATION RUNNING ON A COMPUTER SYSTEM AND PROVIDING INTERACTIVE AUGMENTED REALITY (AR) GRAPHICS

FIELD

The present disclosure relates generally to methods and systems for initiating a virtual try-on application running on a computer system and providing interactive augmented reality (AR) graphics. More particularly, the disclosure relates to generating and overlaying interactive computer graphics at locations onto a live view within graphical user interface (GUI) of the computer system including the interactive graphical representation of information related to a real-world product identified from merchandise information received at the computer system.

BACKGROUND

Physical signage in retail or other establishments is necessary for providing information to visitors and consumers. However, in some instances, physical signage can have limitations. An example limitation is due to a time-limited nature of a promotion being advertised. For example, a paper printed campaign for a new product in-store or a brand of products that are only available or suitable for a short period in some locations can become expired and require replacement. Replacing the paper signage can be costly and time-consuming within a large amount of stores.

Physical signage can have other limitations as well. As another example, a brand or manufacturer may wish to show case more information than can logically fit into a printed signage for a particular space. In such a situation, a sales person may be needed to supplement information for customers on an as-needed basis.

SUMMARY

Within examples, a computer-implemented method is described comprising receiving by a computing device merchandise information, in response to receiving the merchandise information initiating a virtual try-on application running on the computing device to simulate physical application of a real-world product corresponding to the merchandise information onto a portion of a user depicted in visual media, generating by the computing device a composite image including a visual effect on the visual media to simulate physical application of the real-world product onto the portion of the user depicted in the visual media, and providing for display the composite image within an image viewer of a graphical user interface (GUI) of the computing device.

In another example, a system is described comprising a computing device comprising one or more processors and non-transitory computer-readable media having stored therein instructions, which when executed by the one or more processors, causes the computing device to perform functions. The functions comprise receiving merchandise information, in response to receiving the merchandise information initiating a virtual try-on application running on the computing device to simulate physical application of a real-world product corresponding to the merchandise information onto a portion of a user depicted in visual media, generating a composite image including a visual effect on the visual media to simulate physical application of the real-world product onto the portion of the user depicted in the visual media, and providing for display the composite image within an image viewer of a graphical user interface (GUI) of the computing device.

In another example, a non-transitory computer-readable media is described having stored therein executable instructions, which when executed by a computing device having one or more processors causes the computing device to perform functions. The functions comprise receiving merchandise information, in response to receiving the merchandise information initiating a virtual try-on application running on the computing device to simulate physical application of a real-world product corresponding to the merchandise information onto a portion of a user depicted in visual media, generating a composite image including a visual effect on the visual media to simulate physical application of the real-world product onto the portion of the user depicted in the visual media, and providing for display the composite image within an image viewer of a graphical user interface (GUI) of the computing device.

In another example, a computer-implemented method is described comprising: receiving by a computing device merchandise information, in response to receiving the merchandise information, retrieving an interactive graphical representation of information related to the merchandise information, providing for display an augmented reality (AR) graphic overlaid onto a live view within a graphical user interface (GUI) of the computing device including the interactive graphical representation of information related to the merchandise information, receiving a selection of an item of the AR graphic, for a topic of the item of the AR graphic that is selected, accessing via an artificial intelligence (AI) engine data sources to identify retail information that is both (i) related to the merchandise information and (ii) determined to be related to information in a user profile for a user of the computing device, and dynamically modifying content and animation of the AR graphic to customize the content and animation of the AR graphic for the user of the user profile using the retail information.

In another example, a system is described comprising a computing device comprising one or more processors and non-transitory computer-readable media having stored therein instructions, which when executed by the one or more processors, causes the computing device to perform functions. The functions comprise receiving merchandise information, in response to receiving the merchandise information, retrieving an interactive graphical representation of information related to the merchandise information, providing for display an augmented reality (AR) graphic overlaid onto a live view within a graphical user interface (GUI) of the computing device including the interactive graphical representation of information related to the merchandise information, receiving a selection of an item of the AR graphic, for a topic of the item of the AR graphic that is selected, accessing via an artificial intelligence (AI) engine data sources to identify retail information that is both (i) related to the merchandise information and (ii) determined to be related to information in a user profile for a user of the computing device, and dynamically modifying content and animation of the AR graphic to customize the content and animation of the AR graphic for the user of the user profile using the retail information.

In another example, a non-transitory computer-readable media is described having stored therein executable instructions, which when executed by a computing device having one or more processors causes the computing device to perform functions. The functions comprise receiving merchandise information, in response to receiving the merchandise information, retrieving an interactive graphical representation of information related to the merchandise information, providing for display an augmented reality (AR) graphic overlaid onto a live view within a graphical user interface (GUI) of the computing device including the interactive graphical representation of information related to the merchandise information, receiving a selection of an item of the AR graphic, for a topic of the item of the AR graphic that is selected, accessing via an artificial intelligence (AI) engine data sources to identify retail information that is both (i) related to the merchandise information and (ii) determined to be related to information in a user profile for a user of the computing device, and dynamically modifying content and animation of the AR graphic to customize the content and animation of the AR graphic for the user of the user profile using the retail information.

The features, functions, and advantages that have been discussed can be achieved independently in various examples or may be combined in yet other examples. Further details of the examples can be seen with reference to the following description and drawings.

BRIEF DESCRIPTION OF THE FIGURES

Examples, objectives and descriptions of the present disclosure will be readily understood by reference to the following detailed description of illustrative examples when read in conjunction with the accompanying drawings, where the following drawings illustrate examples as described below.

DETAILED DESCRIPTION

Figure 1:
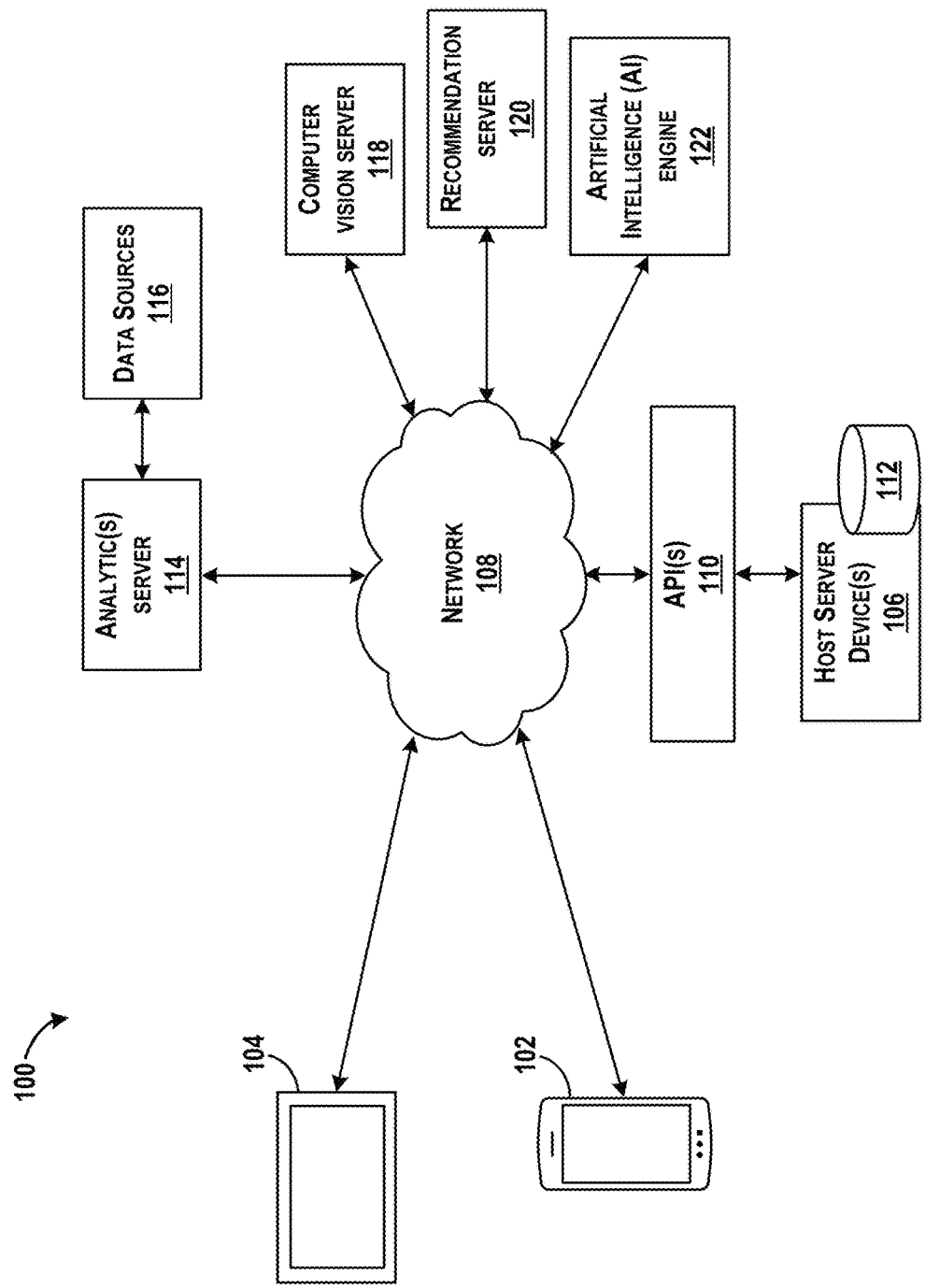
FIG. 1 is a block diagram illustrating an example of a networked computer system, according to an example implementation.

Disclosed examples will now be described more fully hereinafter with reference to the accompanying drawings. Several different examples are described and should not be construed as limited to all possible alternatives. Rather, these examples are described so that this disclosure is thorough and complete and fully conveys a scope of the disclosure to those skilled in the art.

Within examples, systems and methods described herein are beneficial to provide a GUI for display of interactive graphical representations of information related to received merchandise information for purposes or providing a virtual experience on a computing device. The merchandise information can take many forms, and upon receipt of the merchandise information, the virtual experience is triggered to be initiated.

In other examples, receipt of the merchandise information initiates and triggers other types of virtual experiences on the computing device including initiating a virtual try-on application to simulate physical application of a real-world product corresponding to the merchandise information onto a portion of a user depicted in visual media.

The systems and methods described herein provide a manner to cause initiation of the virtual experience on the computing device. Thus, implementations of this disclosure provide technological improvements that are particular to computer technology, for example, those concerning computer vision, computer graphical representation, and product data analysis. Computer-specific technological problems, such as analyzing a digital image for determination and/or identification of a product or of a machine readable label, can be wholly or partially solved by implementations of this disclosure. For example, implementation of this disclosure allows for many types of media (including both visual and non-visual) that is indicative of or includes information corresponding to merchandise information to be analyzed, and corresponding digital graphics to be retrieved specific for a virtual experience mapping to the merchandise information.

Implementations of this disclosure thus introduce new and efficient improvements in the ways in which products, services, and routines are offered or recommended to users through various virtual experiences provided by the computing device. The implementations of the present disclosure also introduce new and efficient improvements in the ways that digital graphics are provided for display by the computing device within the virtual experience.

In an example implementation, physical signage in a retail establishment is enhanced to map to virtual experiences for execution by the computing device. Virtual experiences are stored virtually, and can be changed easily, thus enabling the same physical signage that is present to be used and never needs to be changed in order to change the virtual experience.

Virtual experiences are an addition to or an alternative to overcome limitations of physical signage and adds a possibility of personalizing signage for every guest. The virtual experience can be triggered in many ways including a location of the computing device (e.g., using GPS, NFC or Bluetooth™), scanning of a quick response (QR) code, or a combination of scanning of a brand logo in a specific store and moment in time thus requiring location, time, and receipt of merchandise information to trigger the virtual experience.

While external or physical triggers help start the virtual experience, interactive functionality of the virtual experience occurs on the computing device. User input by tapping, speaking, or selecting interactive graphical icons of the virtual experience quickly create many ways of discovering and engaging with content.

Thus, the physical signage is enhanced and transformed into virtual signage to create immersive audiovisual virtual experiences that provide visual, audio, and haptic feedback, as well as GPS guided experiences to help the user discover a new brand, or a launch of a new product, for example.

In further examples, the virtual experience is tailored to the user in order to customize relevant interactive components by analyzing different metadata sources through artificial intelligence and create complimentary interactive graphics for the user to perceive that more information is available as compared to what physical signage can provide. The virtual experience can be linked to simulations, such as try-ons, skin care routines or treatments, shade matching, etc., for products that were not initially present in the virtual experience but the AI recommends the products as a match for the current user or current virtual experience.

FIG. 1 is a block diagram illustrating an example of a networked computer system 100, according to an example implementation. The networked computer system 100 includes one or more client devices 102 and 104 coupled to one or more host server device(s) 106 via a network 108. The network 108 represents one or more local area networks (LANs), wide area networks (WANs), cellular networks, and/or other networks using any of wired, wireless, terrestrial microwave, or satellite links, and may include the public Internet.

The client devices 102 and 104 can be a special purpose data processor, a general-purpose computer, smartphone, tablet, a computer system, or a group of networked computers or computer systems configured to perform steps or modes of methods described herein. Further examples of the client devices 102 and 104 may include, without limitation, handheld computers, wearable devices, laptop computers, desktop computers, servers, portable media players, gaming devices, in-store kiosks, and so forth. According to one example, the client devices 102 and 104 are built on a personal computer platform, such as the Apple® or Android® platform. Although FIG. 1 illustrates two of the client devices 102 and 104, the networked computer system may include fewer or more of the client devices 102 and 104 operating at any time. The client devices 102 and 104 represent computing devices (and the terms client device and computing device are used interchangeably throughout), which can be portable in nature as described above.

The host server devices(s) 106 may include any number of computers, virtual machine instances, and/or data centers that are configured to host or execute one or more instances of host applications. The host server devices(s) 106 may be involved, directly or indirectly, in processing requests received from the client devices 102 and 104. The host server devices(s) 106 may comprise, for example, one or more of a network device, a web server, an application server, a database server, etc. A collection of the host server devices(s) 106 may be configured to implement a network-based service. For example, a provider of a network-based service may configure one or more of the host server devices(s) 106 and host applications (e.g., one or more web servers, application servers, database servers, etc.) to collectively implement a network-based application.

The client devices 102 and 104 communicate with one or more host applications at the host server devices(s) 106 to exchange information. The communication between the client devices 102 and 104 and a host application may, for example, be based on the Hypertext Transfer Protocol (HTTP) or any other network protocol. Content delivered from the host application to the client devices 102 and 104 may include, for example, HTML, documents, media content, etc. The communication between the client devices 102 and 104 and a host application may include sending various requests and receiving data packets. For example, the client devices 102 and 104 or an application running on the client devices 102 and 104 may initiate communication with a host application by making a request for a specific resource (e.g., based on an HTTP request), and the host server devices(s) 106 may respond with the requested content stored in one or more response packets.

Thus, one or more client applications may be executed at the client devices 102 and 104. Some applications executing at the client devices 102 and 104 may implement one or more application programming interfaces (APIs) 110. The APIs 110, for example, process inputs and control outputs of the client devices 102 and 104. For example, a client application executing at the client devices 102 and 104 accesses the host server device(s) 106 via the API 110 to retrieve configuration parameters for a particular requested skin advisor platform. The client application then uses local image processing libraries along with retrieved configuration parameters to generate visual media in response to a request by the host server device(s) 106.

The APIs 110 serve as an interface between the client devices 102 and 104 and the host server device(s) 106. One or more repositories and/or databases 112, which support certain utilities, may store content required for implementing the skin advisor platform described herein, and is accessible by the host server device(s) 106. For example, the databases 112 store host applications, content (e.g., images/video), data related to image processing (e.g., image processing libraries, computer graphics, predefined visual effects, etc.), information relevant to the users (e.g., registration information or usage statistics), metadata, and any other data used in implementing the techniques described herein.

Thus, in some examples, techniques described herein are provided by a virtual signage platform that is made accessible via a website or an application via the API 110. Alternatively, or in addition, techniques described herein are offered as a platform product directly implementable on various devices or systems.

The networked computer system 100 also includes an analytic(s) server 114. The analytic(s) server 114 performs analytics on data related to usage behavior of the networked computer system 100. Such analytics may support other services including product recommendations and targeted marketing.

The networked computer system 100 also includes one or more data sources 116 accessible by the analytic(s) server 114. The data sources 116 generally refer to any sources from which data is received to implement features described herein. As a few illustrative examples, the data sources 116 include makeup product vendors, manufacturers, retailers, etc., content providers/licensing services, modeling services, and machine generated data sources such as server log files, activity log files, configuration files, messages, network packet data, performance measurements, sensor measurements, and the like.

The networked computer system 100 also includes a computer vision server 118. The computer vision server 118 is in communication with the client devices 102 and 104 and the host server device(s) 106 via the network 108 to receive visual media including a face, a body, or a portion of a face or body of a user, and process the visual media to generate information for a number of different physical characteristics of a user. The visual media can include a digital image, multiple frames of images, video, etc., and the images can include visible images (red, green, blue color images), infrared images, or other type of imaging based on cameras or sensors included on the client devices 102 and 104.

The computer vision server 118 includes computational ability to perform computer vision tasks for identifying and localizing a face in an image (e.g., using any number of algorithms such as the classical feature-based cascade classifier using the OpenCV library or a Multi-task Cascade convolutional neural network (MTCNN) via the MTCNN library) to find coordinates of the face in the image or demarcating an extent of the face (e.g., with a bounding box). Following, the computer vision server 118 identifies landmarks on the face (e.g., nose, eyes, lips, etc.) through any number of algorithms or through use of pre-trained models in a machine learning algorithm. The computer vision server 118 then outputs, to the host server device(s) 106 and/or to the client devices 102 and 104, information for physical characteristics of features of a user.

Example physical characteristics can include information related to a skin condition, which describes an extrinsic dermatological affection that manifests itself visually on a surface of the skin of the user. A skin condition may include wrinkles, redness, dullness, discoloration, acne or breakouts, oiliness, puffiness, dark circles, etc. Other example physical characteristics include intrinsic properties of a face, such as shape of eyes, nose, cheek bones, etc.

The networked computer system 100 also includes a recommendation server 120. The recommendation server 120 can include or have access to a database containing product information, beauty services information, etc., which is accessible via the network 108 by the host server device(s) 106. In example operation, the host server device(s) 106 uses information from the output of the computer vision server 118 to select or receive an applicable product, entity, or service from the recommendation server 120 that would address an identified physical characteristic of the user detected in the visual media.

The networked computer system 100 also includes an artificial intelligence (AI) engine 122. The AI engine 122 can include or have access to databases, such as the database 112 and/or data sources 116, to access data related to merchandise information and to a user profile for a user of the client devices 102 and 104 so as to identify retail information that may be considered relevant and related. The AI engine 122 generates outputs useful for modifying content and animation of the graphics presented for display on the client devices 102 and 104 to customize the content and animation of graphics for the user of the user profile accordingly.

Figure 2:
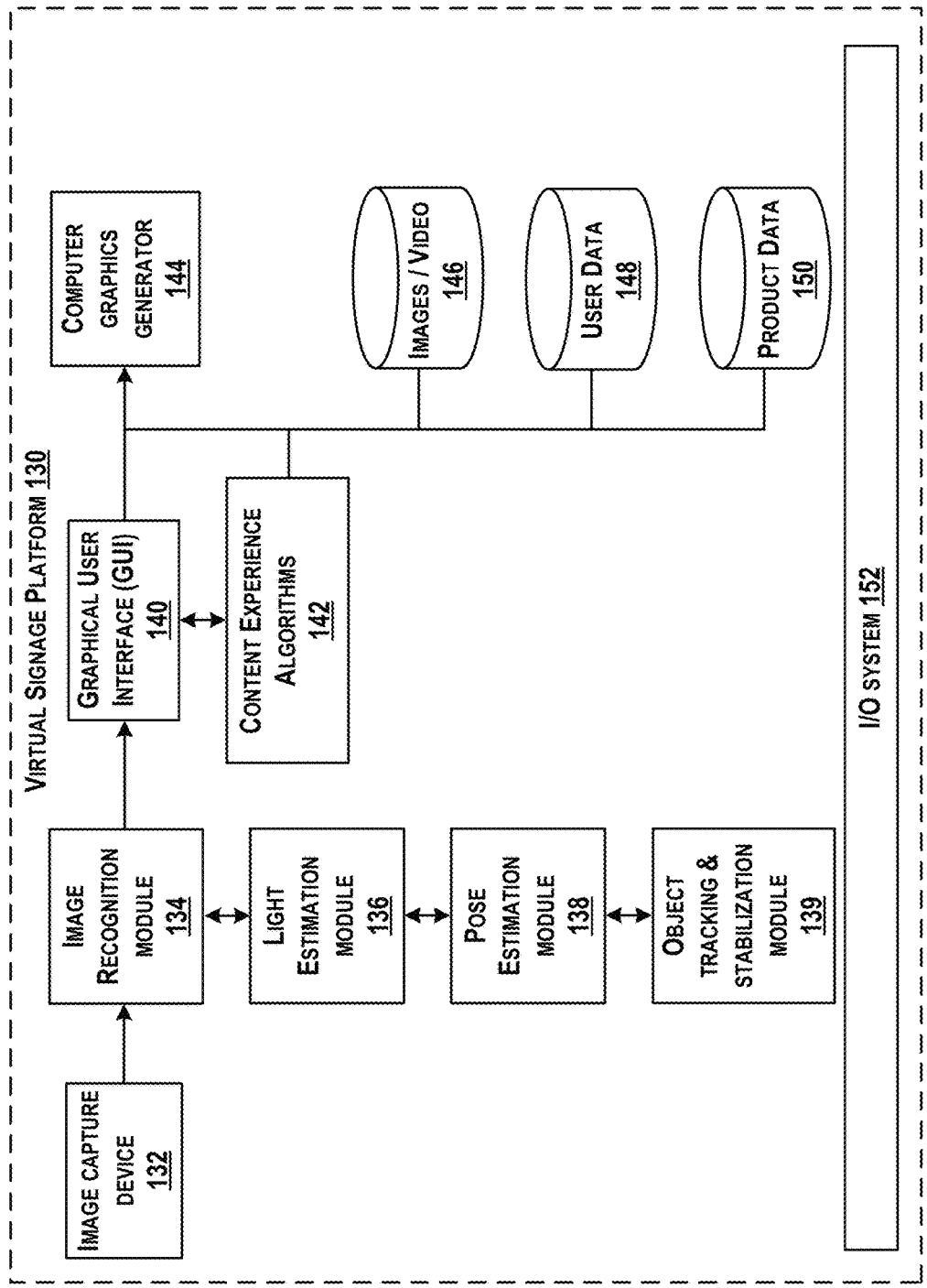
FIG. 2 illustrates a block diagram of a virtual signage platform, according to an example implementation.

FIG. 2 illustrates a block diagram of a virtual signage platform 130, according to an example implementation. Within examples, some or all of the components of the networked computer system 100 perform some functions of the virtual signage platform 130. Depending upon a particular implementation, the various components described with respect to FIG. 2 are implemented at a single computing device (e.g., the host server device(s) 106 or one of the client devices 102 and 104) or distributed across several computing devices or servers. In some examples, certain functionalities of the virtual signage platform 130 (e.g., image capture) are performed at one of the client devices 102 and 104 while other functionalities (e.g., image recognition) are performed at a remote server device. For instance, functions of the computer vision server 118 is performed remotely at a server device in one example, and in another example, functions of the computer vision server 118 are performed locally at the client devices 102 and 104.

Figure 3:
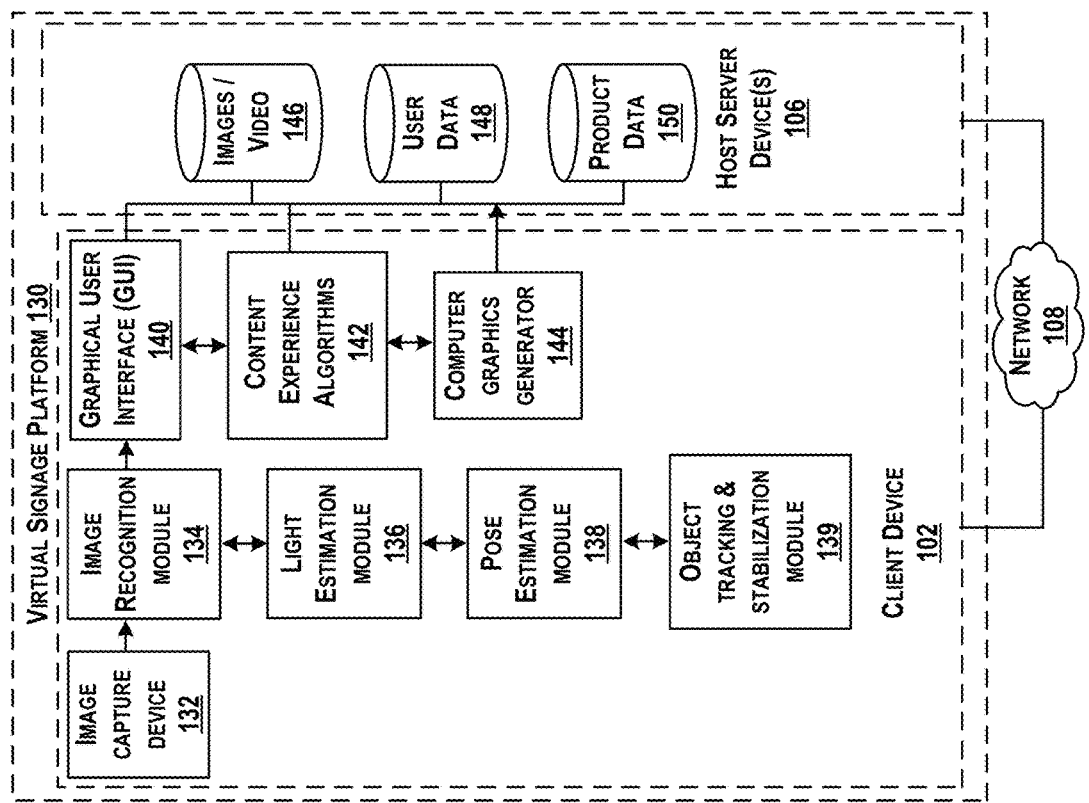
FIG. 3 illustrates a block diagram of an example implementation of the virtual signage platform, according to an example implementation, in which some components described with respect to FIG. 2 are instantiated at the client devices and some components are instantiated at the host server device(s).

FIG. 3 illustrates a block diagram of an example implementation of the virtual signage platform 130, according to an example implementation, in which some components described with respect to FIG. 2 are instantiated at the client devices 102 and some components are instantiated at the host server device(s) 106, and in which the client device 102 and the host server device(s) are communicatively coupled via the network 108.

Figure 4:
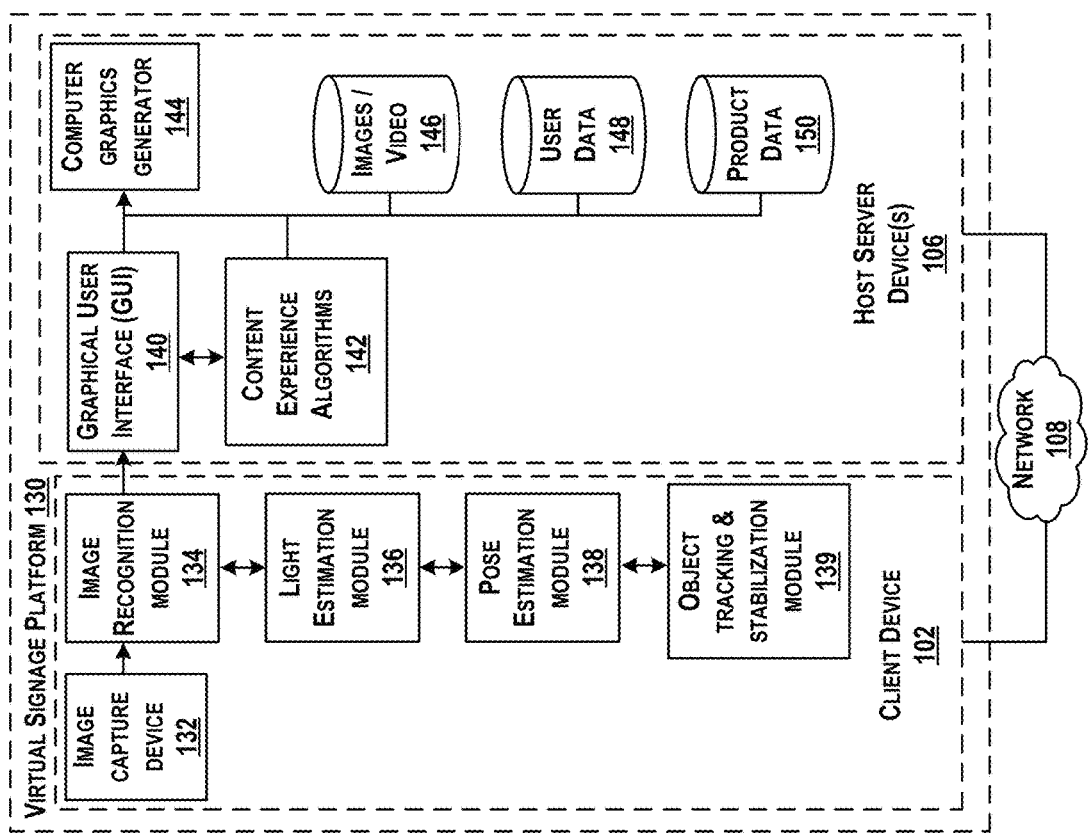
FIG. 4 illustrates a block diagram of another example implementation of the virtual signage platform, according to an example implementation, in which other components described with respect to FIG. 2 are instantiated at the client devices and other components are instantiated at the host server device(s).

FIG. 4 illustrates a block diagram of another example implementation of the virtual signage platform 130, according to an example implementation, in which other components described with respect to FIG. 2 are instantiated at the client devices 102 and other components are instantiated at the host server device(s) 106, and in which the client device 102 and the host server device(s) are communicatively coupled via the network 108.

The example implementations shown in FIGS. 3 and 4 are provided for illustrative purposes only, and components of the virtual signage platform 130 can be distributed differently in other examples.

With reference to FIGS. 2-4, some components are described as "modules" or "engines", and such components include general purpose or special purpose hardware (e.g., general or special purpose processors), firmware, an/or software embodied in a non-transitory computer-readable (storage) medium for execution by one or more processors to perform described functionality.

The virtual signage platform 130 includes an image capture device 132 in a form of software and/or hardware for capturing media (images or video) at one of the client devices 102 and 104. For example, the image capture device 132 includes a digital camera including one or more optical sensors for conversion of received light to visual media such as digital information (e.g., charge-coupled devices (CCD), complementary metal-oxide semiconductor (CMOS) phototransistors, etc.). In another example, the image capture device 132 includes a bar code reader, an optical scanning sensor, or other sensor capable of receiving a machine readable label. In another example, the image capture device 132 also includes software for pre-processing raw image data.

Within examples, the virtual signage platform 130 enables capture via the image capture device 132 of many different kinds of media that includes or is indicative of the merchandise information. One type includes machine readable labels, such as bar codes, quick response (QR) codes, or other arrangement of graphics or printed items. Another type of merchandise information includes a digital image of a product or portion of a product, for example.

Within further examples, the virtual signage platform 130 enables capture via the image capture device 132 of still other different kinds of media that includes or is indicative of the face of the user. One type includes visual media, such as a single digital image, multiple digital images, and videos. Other types include non-visual media, such as infrared (IR) images or data, and hyperspectral images or data. Still other types of media include media captured based on the visible light spectrum or other spectral bands such as ultra-violet (UV). A number of media captured and a type of media captured depends on image capture sensors or devices available or included on the client devices 102 and 104. In examples where non-visual media is captured, such data is useful for further analysis of the face to determine contours and other three-dimensional (3D) aspects.

An image recognition module 134 receives or retrieves the media captured by the image capture device 132, and processes the media based on a type of media captured. In an example where the media is merchandise information, the image recognition module 134 processes the information by recognizing a QR code, performing object recognition of a product in a digital image, or accessing a database to identify a product using a machine readable label, for example.

In an example where the media is visual media of a face of the user, the image recognition module 134 processes the visual media to: first, determine if a face is present or not, second, detect the bounding box of the face, third perform detection of the facial features, and finally assist with generation of information for each of a plurality of zones of the face of the user. The processing results in generation of information including boundaries of distinct zones of the face (e.g., eyes, lips, cheeks), skin conditions that are present (e.g., discoloration, wrinkles, lines, dark spots), or other physical characteristics of the user (e.g., shade of skin tone, etc.).

The virtual signage platform 130 further includes a light estimation module 136 to evaluate one or more characteristics of illumination for the visual media. Based on the one or more characteristics of illumination for the visual media not meeting a quality level, the light estimation module 136 requests a new visual media including the face of the user or image of an object with an adjustment to lighting in an environment.

The virtual signage platform 130 further includes a pose estimation module 138 to evaluate one or more characteristics of a pose of the face of the user in the visual media. Based on the one or more characteristics of the pose of the face of the user in the visual media indicating a threshold amount of the face of the user is not included in the visual media, the pose estimation module 138 requests the user to adjust a position of the face for capture of new visual media.

The virtual signage platform 130 further includes an object tracking and stabilization module 139. In an example where the media is video, the object tracking and stabilization module 139 processes the video to perform feature tracking over frames of the video to output information of positional or location changes of features from frame to frame. For example, the object tracking and stabilization module 139 processes the video to perform object tracking or facial tracking as such features may move in the video. Any and all identified (or unidentified) features can be tracked in the video, including background or foreground objects.

The virtual signage platform 130 further includes a graphical user interface (GUI) 140 that allows users to interact with the client devices 102 and 104 through graphical icons and audio indicators, typed command labels or text navigation. The GUI 140 includes interactive elements selectable for providing input by a user or receiving outputs by the GUI 140. The GUI 140 operates to provide information based on content experience algorithms 142 executable to generate an interactive graphical representation of information related to the merchandise information. Details of the content experience algorithms 142 are more fully described below.

The virtual signage platform 130 further includes a computer graphics generator 144 to generate or select computer graphics applicable for display by the GUI 140 to be representative of the merchandise information. The GUI 140 is operated to overlay computer graphics output by the computer graphics generator 144 at locations onto the visual media including the face of the user in examples where a virtual try-on simulation is being performed. Where the media is video, outputs of the object tracking and stabilization module 139 are used to map the computer graphics to corresponding features of the face over time as the face moves within the video. The GUI 140 is operated additionally or alternatively to overlay computer graphics output by the computer graphics generator 144 at locations onto a live view within the GUI 140 providing for display of AR graphics positioned to be anchored to a physical location of a product in the live view. In FIG. 3, the computer graphics generator 144 is shown within the client device 102, and the GUI 140 is communicatively coupled to the computer graphics generator 144 through an internal bus (not shown). In FIG. 4, the computer graphics generator 144 is shown within the host server device 106 in communication with the GUI 140.

The virtual signage platform 130 further includes or has access to databases such as an images/video database 146 that stores the visual media received according to permissions set by the user, a user data database 148 that stores user data (e.g., age, preferences, goals, past purchases, navigation history, etc.) according to permissions set by the user, and a product data database 150 that stores details of products.

In some examples, when permissions are set accordingly by the user, the image recognition module 134 is operated to retrieve visual media of a face of the user from the images/video database 146 (rather than in real-time or substantially real-time from the image capture device 132) for access to pre-existing visual media to process. Based on permission set, the image recognition module 134 is operated to identify other objects in the visual media as well, such as products, display cases, storefronts, etc.

The virtual signage platform 130 further includes an input/output (I/O) system 152 that couples components of the virtual signage platform 130 to input and output devices of any type. For example, for components of the virtual signage platform 130 that are instantiated at one of the client devices 102 and 104, the I/O system 152 couples to a touch screen display device through which outputs are displayed and user inputs (e.g., touch gestures) are received, the image capture device 132 through which image data is received, and/or a network device through which data is transmitted/received over the network 108. Similarly, for components of the virtual signage platform 130 that are instantiated at the host server device(s) 106, the I/O system 152 couples to a network device through which data is transmitted/received over the network 108.

Figure 5:
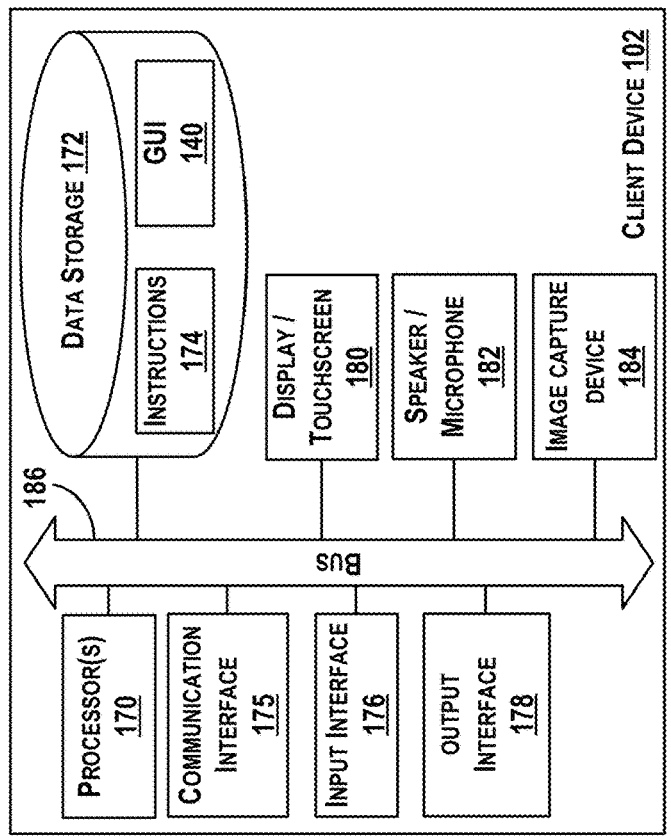
FIG. 5 illustrates a simplified block diagram of the client device, according to an example implementation.

FIG. 5 illustrates a simplified block diagram of the client device 102, according to an example implementation. FIG. 5 does not necessarily show all of the hardware and software modules included in the client device 102, and omits physical and logical connections that will be apparent to one of ordinary skill in the art after review of the present disclosure. Although FIG. 5 illustrates components for the client device 102, the features shown in FIG. 5 are illustrative as components of any client device for use in the networked computer system 100.

The client device 102 includes one or more processor(s) 170, and a non-transitory computer-readable media (data storage) 172 storing instructions 174, which when executed by the one or more processor(s) 170, causes the client device 102 to perform functions (as described below). To perform functions, the client device 102 includes a communication interface 175, an input interface 176, an output interface 178, a display/touchscreen 180, a speaker/microphone 182, and an image capture device 184, and each component of the client device 102 is connected to a communication bus 186. The client device 102 may also include hardware to enable communication within the client device 102 and between the client device 102 and other devices (not shown). The hardware may include transmitters, receivers, and antennas, for example.

The communication interface 175 is a wireless interface and/or one or more wireline interfaces that allow for both short-range communication and long-range communication to one or more networks or to one or more remote devices. Such wireless interfaces provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 175 is configured to receive input data from one or more devices, and configured to send output data to other devices.

The data storage 172 includes or takes the form of memory, such as one or more computer-readable storage media that can be read or accessed by the one or more processor(s) 170. The computer-readable storage media can include volatile and/or non-volatile storage components, such as optical, magnetic, organic or other memory or disc storage, which can be integrated in whole or in part with the one or more processor(s) 170. The non-transitory data storage 172 is considered non-transitory computer readable media. In some examples, the non-transitory data storage 172 can be implemented using a single physical device (e.g., one optical, magnetic, organic or other memory or disc storage unit), while in other examples, the non-transitory data storage 172 can be implemented using two or more physical devices. The non-transitory data storage 172 thus is a computer readable medium, and instructions 174 are stored thereon. The instructions 174 include computer executable code. The data storage 172 further stores information executable by the processor(s) 170 to perform functions of the GUI 140, for example.

The one or more processor(s) 170 is a general-purpose processor or special purpose processor (e.g., digital signal processors, application specific integrated circuits, etc.). The one or more processor(s) 170 receives inputs from the communication interface 175 as well as from other components (the display/touchscreen 180, the speaker/microphone 182, or the image capture device 184), and processes the inputs to generate outputs that are stored in the non-transitory data storage 172. The one or more processor(s) 170 can be configured to execute the instructions 174 (e.g., computer-readable program instructions) that are stored in the non-transitory data storage 172 and are executable to provide the functionality of the client device 102 described herein.

The input interface 176 is used to enter data or commands and can include, for example, a keyboard, a scanner, a user pointing device such as, for example, a mouse, a trackball, or a touch pad, or may further include the touchscreen or microphone.

The output interface 178 outputs information for reporting or storage, and thus, the output interface 178 may be similar to the communication interface 175 and can be a wireless interface (e.g., transmitter) or a wired interface as well.

Figure 6:
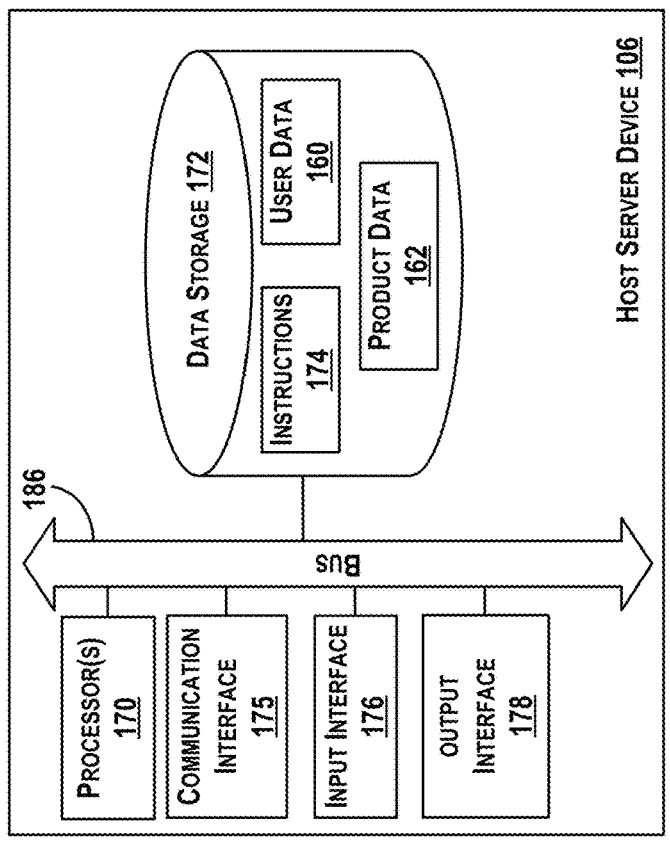
FIG. 6 illustrates a simplified block diagram of the host server device, according to an example implementation.

FIG. 6 illustrates a simplified block diagram of the host server device 106, according to an example implementation. Like the illustration in FIG. 5, FIG. 6 does not necessarily show all of the hardware and software modules included in the host server device 106. Further, similar components illustrated in FIG. 6 that have been described with reference to FIGS. 2-5 are not repeated here.

The host server device 106 can take the form of a server computer, a client computer, a personal computer (PC), a user device, a tablet, a laptop computer, a set-top box (STB), a personal digital assistant (PDA), a thin-client device, or any machine capable of executing a set of instructions (sequential or otherwise) that specify actions to be taken by that machine.

Within one example, in operation, when the instructions 174 are executed by the one or more processor(s) 170 (of the client device 102 or in other examples of the host server device 106, or still in other examples of a combination of the client device 102 and the host server device 106), the one or more processor(s) 170 is caused to perform functions for to trigger a virtual experience for the user. The virtual experience is initiated by receipt by the processor(s) 170 of the computing device of a data item captured from an environment. The virtual experience has many forms.

In one example, the virtual experience takes the form of an instant virtual try-on simulation triggered by receiving merchandise information captured by the client device 102. In another example, the virtual experience takes the form of an augmented reality (AR) graphic overlaid onto a live view within the GUI 140 of the computing device 102 including an interactive graphical representation of information related to the merchandise information.

Figure 7:
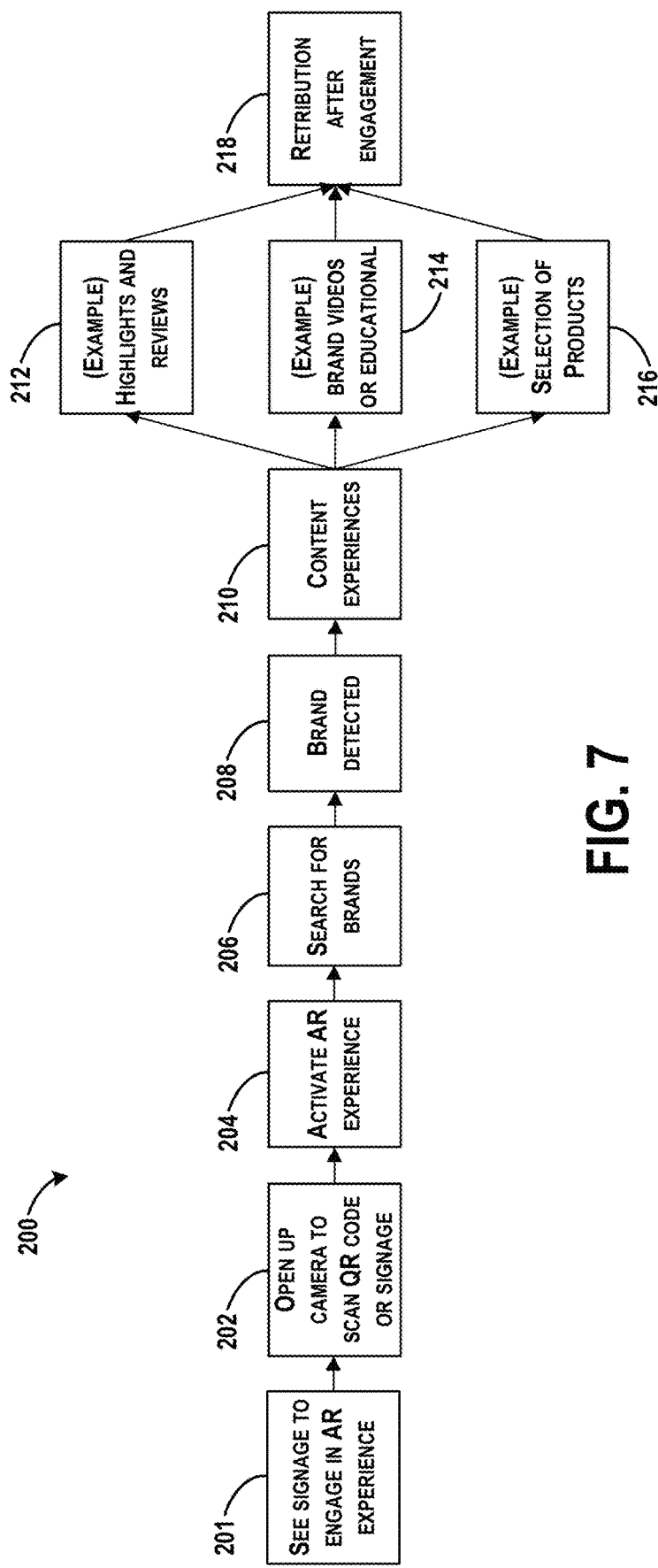
FIG. 7 is a high level flowchart illustrating an example of a computer-implemented method for initiating a virtual experience, according to an example implementation.

FIG. 7 is a high level flowchart illustrating an example of a computer-implemented method 200 for initiating a virtual experience, according to an example implementation. Method 200 shown in FIG. 7 presents an example of a method that could be used with the networked computer system 100, the client devices 102 and 104, and/or the host server device(s) 106 shown in FIG. 1 or with the virtual signage platform 130 shown in FIGS. 2-4, for example. Method 200 also presents an example of functions to be performed to generate outputs for display by the GUI 140.

At block 201, a user of the computing device 102 sees signage in a retail establishment, for example, to engage in an AR experience. At block 202, the user opens up a camera application on the computing device 102 to access the image capture device 132 for use to scan the signage. In an example, the signage includes a QR code. At block 204, the virtual signage platform 130 activates the AR experience by determining merchandise information associated with the QR code. At block 206, the virtual signage platform 130 further searches for brands or manufacturers of products associated with the merchandise information. Upon detecting corresponding brands as shown at block 208, content experiences are retrieved from data source as shown at block 210. Many different types of content experiences are possible including highlights and reviews of the brand or product as shown at block 212, brand or educational videos as shown at block 214, and selection of product listings as shown at block 216 (e.g., selection of product listings may include a top sellers listing, a personalized listing for a specific user based on data in user profile, or other listings of products determined by the AI engine 122). In further examples, content experiences also include product offerings, such as product promotions, product discounts, or other flash sales and marketing notices. A user can engage with the content experience in an interactive manner by selecting items displayed in the GUI 140 and continue to engage the AR environment. At block 218, after engagement, the virtual signage platform 130 can offer retribution to the user, such as in the form of a promotion of discount on a product.

Figure 9:
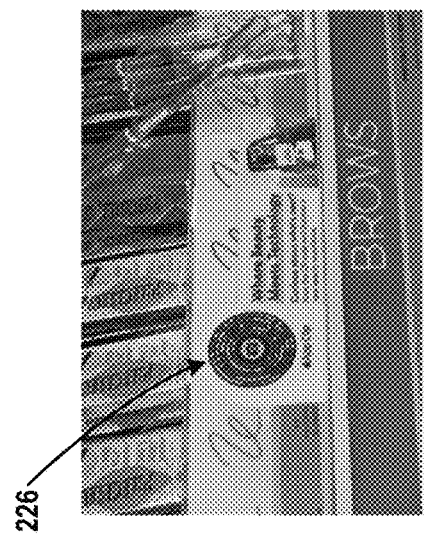
FIG. 9 illustrates an example of the machine readable label, according to an example implementation.
Figure 10:
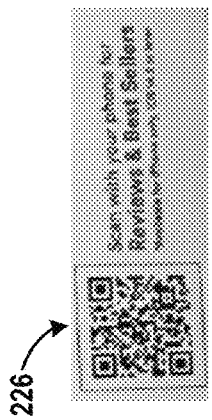
FIG. 10 illustrates another example of the machine readable label, according to an example implementation.
Figure 8:
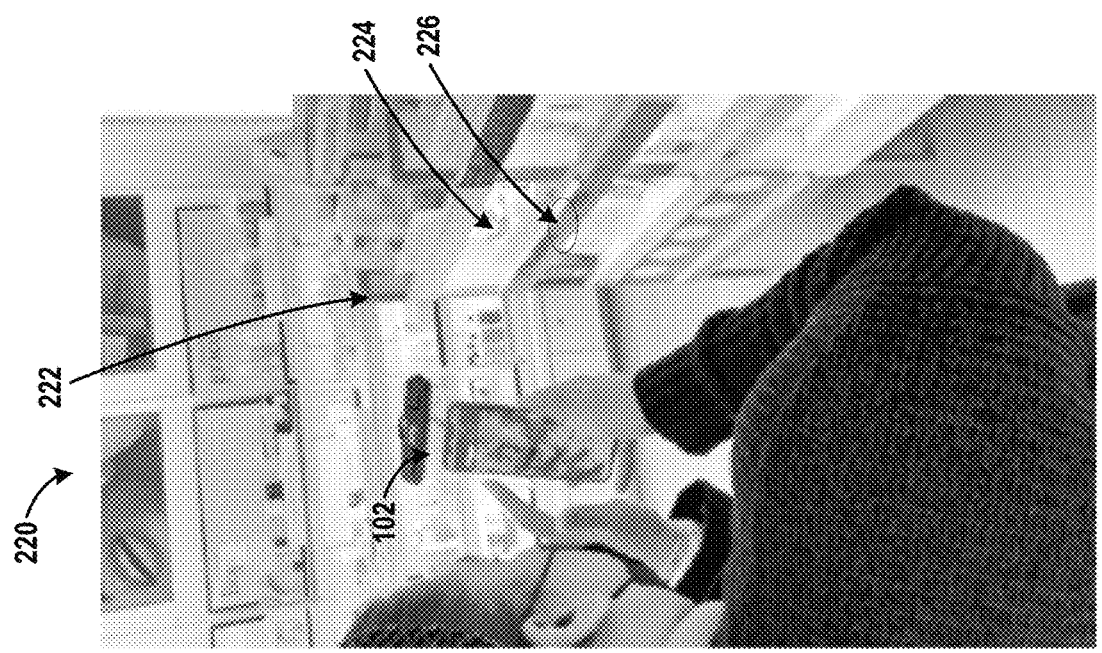
FIG. 8 illustrates an example retail establishment including merchandise information programmed to trigger a virtual experience, according to an example implementation.

FIGS. 8-10 are conceptual illustrations showing an example implementation of the method 200 shown in FIG. 7.

FIG. 8 illustrates an example retail establishment 220 including merchandise information programmed to trigger a virtual experience, according to an example implementation. The retail establishment 220 includes a shopping display 222 holding products 224 for sale. Positioned nearby the shopping display 222 is a machine readable label 226. A user shopping in the retail establishment 220 operates the computing device 102 to receive merchandise information, such as in this example, be receiving the machine readable label 226 from the shopping display 222. The image capture device 132 of the computing device 102 is operated to capture an image of the machine readable label 226, for example.

FIG. 9 illustrates an example of the machine readable label, according to an example implementation. In FIG. 9, the machine readable label includes a geometric design (e.g., a circle or concentric circles that are incomplete), which maps to merchandise information. FIG. 10 illustrates another example of the machine readable label, according to an example implementation. In FIG. 10, the machine readable label includes a QR code (e.g., a combination of shapes in a specific arrangement and spacing), which maps to merchandise information. Thus, the computing device 102 accesses data sources (locally or via the network 108) to identify the merchandise information from the machine readable label.

In further examples, the computing device 102 captures the merchandise information at the retail establishment 220 by receiving an image (e.g., digital image captured via the image capture device 132) including at least a portion of the products 224 (e.g., one of the real-world products), and performing object recognition of the real-world product within the image. The computing device 102 accesses data sources (locally or via the network 108) to identify the product 224 within the captured image.

In another example, the computing device 102 captures the merchandise information at the retail establishment 220 by receiving an image (e.g., digital image captured via the image capture device 132) including at least a portion of a brand identifier of the products 224 or a portion of a product identifier. Examples of a brand identifier include a name of a manufacturer, a logo of a manufacturer, a color combination of a brand, a trademarked shape of a container for a product, etc. Examples of a product identifier include a bar code, a UPC number, a product number, a model number, etc. The computing device 102 accesses data sources (locally or via the network 108) to identify the product 224 using the brand identifier or the product identifier.

In another example, the computing device 102 captures the merchandise information at the retail establishment 220 by receiving an image (e.g., digital image captured via the image capture device 132) including information for a grouping of products or information for a category of products. For example, based on the captured image including multiple products of a specific combination, the computing device 102 accesses data sources (locally or via the network 108) to identify the product 224 that is a subject of the virtual experience.

Thus, the merchandise information can be captured or received by the computing device in many forms, and based on receiving the merchandise information, the computing device 102 is programmed to trigger the virtual experience.

Figure 11:
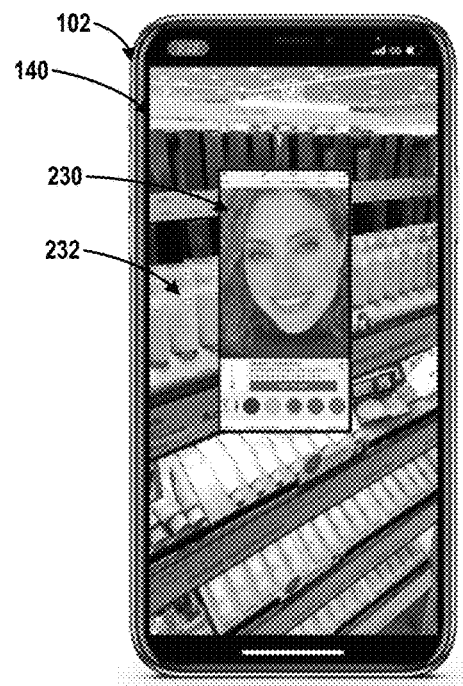
FIG. 11 illustrates an example virtual experience, according to an example implementation.

FIG. 11 illustrates an example virtual experience, according to an example implementation. In FIG. 11, in response to receiving, by the computing device 102, the merchandise information, the computing device 102 initiates a virtual try-on application running on the computing device 102 to simulate physical application of a real-world product corresponding to the merchandise information onto a portion of a user depicted in visual media. For example, the computing device 102 generate a composite image including a visual effect on the visual media to simulate physical application of the real-world product onto the portion of the user depicted in the visual media, and provides for display the composite image within an image viewer 230 of the GUI 140 of the computing device 102.

Thus, in the example shown in FIG. 11, capturing the merchandise information triggers the virtual try-on application to be initiated. As soon as the computing device 102 scans the QR code, for example, the virtual try-on application is initiated and the composite image is displayed. The image viewer 230 is a thumbnail image viewer of the GUI 140, in one example. Upon receiving an input selecting the composite image in the thumbnail image viewer, the computing device 102 switches display on the computing device 102 to the virtual try-on application including a full size display of the composite image.

The GUI 140 includes a live view 232, and the computing device 102 displays the image viewer 230 overlaid onto the live view 232 of the GUI 140.

In one example, operation of the virtual try-on application includes requesting, via the GUI 140, visual media including a face of the user, retrieving product definition data for a real-world product identified from the merchandise information (e.g., lipstick), and performing simulation of the real world product onto the visual media of the face of the user. The simulation includes using the product definition data that includes a selection of filters from a group of filters which when applied in combination result in generation of the visual effect on the visual media to simulate physical application of the real-world product onto the portion of the user depicted in the visual media. Different filters specify different visual effects to apply, such as color, glitter, feather, lighting, etc. The product definition data for a specific product specifics the number and type of filters and the combination of such filters to be applied to generate the visual effect within a makeup image that is overlaid onto the visual media to generate the composite image.

Figure 12:
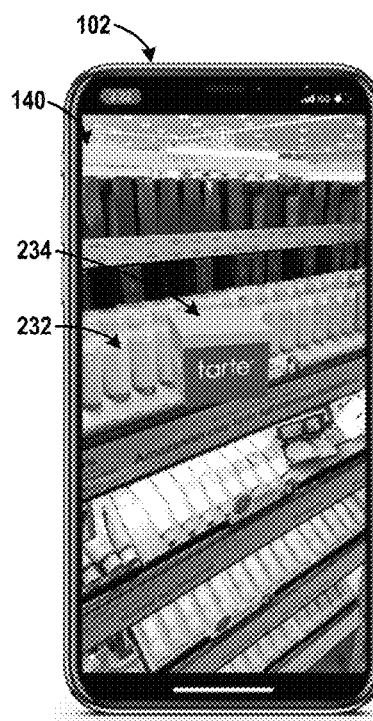
FIG. 12 illustrates another example virtual experience, according to an example implementation.

FIG. 12 illustrates another example virtual experience, according to an example implementation. In FIG. 12, the machine readable label identifies an interactive graphical representation of information related to the real-world product that corresponds to the merchandise information. Thus, in response to receiving the merchandise information, the computing device 102 retrieves the interactive graphical representation of information related to the real-world product, and provides for display an augmented reality (AR) graphic 234 within the GUI 140 including the interactive graphical representation of information related to the real-world product.

Figure 15:
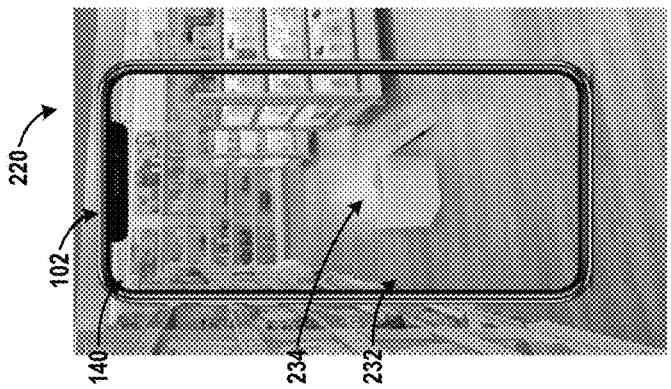
FIG. 15 illustrates a conceptual illustration including a field of view of the computing device is shown with respect to the retail establishment for perspective, according to an example implementation.

In one example, the AR graphic 234 is overlaid onto the live view 232 of the GUI 140. In particular, in FIG. 12, the AR graphic 234 is overlaid onto the live view 232 and positioned to be anchored to a physical location of the real-world product in the live view 232. To do so, in one example, a simultaneous localization and mapping (SLAM) algorithm is executed by the GUI 140 or other module of the client device 102 to identify background objects in the image (e.g., an environment of the store) and then to identify an area for positioning the AR graphic 234. As objects are identified, line and plane detection is performed for generation of a digital rendering of components of the image. A flat plane or substantially flat plane is associated with a floor and can be identified as a suitable location to position the AR graphic 234 for a virtual rendering of a "box" on the ground in the store, as shown in FIG. 15. Thus, as the computing device 102 is moved to change a field of view of the image capture device 132, the AR graphic 234 remains in place and positioned in the virtual space represented by a physical location of the real-world product.

The AR graphic 234 is shown as a box with a label for the brand or product. The AR graphic 234 includes a three-dimensional (3D) graphic, and as the user interacts with the box, animation is initiated.

Figure 13:
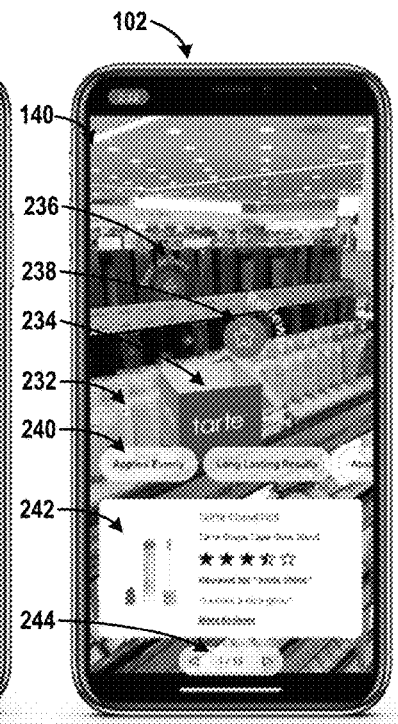
FIG. 13 illustrates an example of interaction with the virtual experience, according to an example implementation.

FIG. 13 illustrates an example of interaction with the virtual experience, according to an example implementation. For example, upon receiving a selection of the box through the touchscreen, the AR graphic 234 opens and further interactive graphical representations appear such as graphics for best sellers 236 and reviews 238. Although the graphical representation indicates best sellers 236 and reviews 238, other merchandise information can be represented as well. In addition, the best sellers 236 category is an example grouping of products and other groupings of products may be presented as well, such as products personalized to a user profile, products newly released, or any selection of a group of products determined to be of interest to a specific user profile.

Upon selection of one of the interactive graphical representations, such as selection of reviews 238 shown in FIG. 13, two-dimensional (2D) cards 240 are illustrated as related to topics of reviews for the product and are overlaid onto the live view 232 of the GUI 140. A product card 242 is also illustrated and overlaid onto the live view 232 of the GUI 140 with further details and review of the product, and when additional information is present, a page finder 244 is displayed allowing for further selection of additional pages related to the additional information for the product. Example information can include videos, ingredients of the product, related products, etc.

In some examples, upon receiving a selection of an item of the AR graphic 234, for a topic of the item of the AR graphic 234 that is selected, the computing device 102 accesses via the AI engine 122 data sources to identify retail information that is both (i) related to the merchandise information and (ii) determined to be related to information in a user profile for a user of the computing device 102. The computing device 102 then dynamically modifies content and animation of the AR graphic 234 to customize the content and animation of the AR graphic 34 for the user of the user profile using the retail information. In one example, the user profile includes past purchases of products, products "liked" by the user, products used in a virtual try-on simulation, etc., and the AI engine 122 accesses these products associated with the user profile to identify and select products that are related to the current product being browsed by the user in the virtual experience. Any information of the identified related products can be offered to the user within the virtual experience through additional interactive graphics, media (including audio and/or video), within 2D cards, etc.

In one example, information of reviews is presented and arranged by concepts (keywords), and upon selection of a topic (e.g., one of the 2D cards 240), the reviews associated with that topic are displayed.

In another example, information of reviews is presented and arranged by generating a section level of product categories (e.g., serum, moisturizers) prior to filtering by keywords, and then the categories are matched with products in the best sellers. For example, for a category to which the product belongs, other products in the category are presented as related products.

Figure 14:
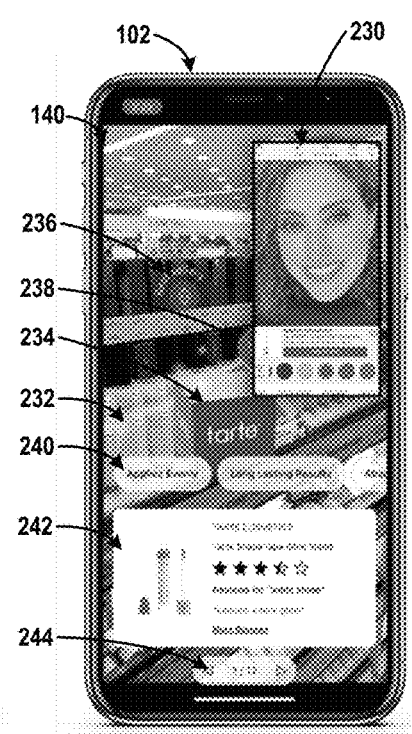
FIG. 14 illustrates another example of interaction with the virtual experience, according to an example implementation.

FIG. 14 illustrates another example of interaction with the virtual experience, according to an example implementation. In an example where the virtual experience begins as shown in FIG. 12, upon receiving selection of items of the AR graphics 234 and of a specific product identified in the product card 242, the computing device 102 then initiates the virtual try-on application running on the computing device 102 to simulate physical application of the selected real-world product and displays the composite image within the image viewer 230 of the GUI 140 of the computing device 102. In FIG. 14, the image viewer 230 is overlaid onto the live view 232 and displayed over any AR graphics and interactive graphics of the GUI 140.

Thus, in a first example, the computing device 102 is programmed to trigger the virtual try-on application in response to receiving the merchandise information. In a second example, the computing device 102 initiates the virtual try-on application in response to interaction with the AR graphic 234 and/or in response to further interactive graphics and 2D cards presented in the virtual experience of the GUI 140.

Figure 16:
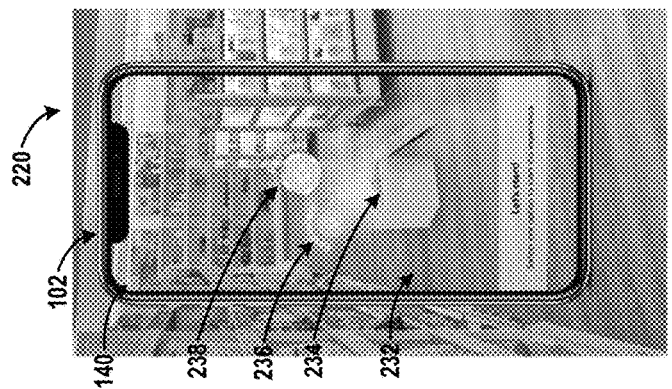
FIG. 16 illustrates example interactive graphical representations of the virtual experience, according to an example implementation.

FIGS. 15-18 illustrate another example virtual experience, according to an example implementation. In FIG. 15, a conceptual illustration is shown in which a field of view of the computing device 102 is shown with respect to the retail establishment 220 for perspective. In response to receiving the merchandise information, the computing device 102 retrieves an interactive graphical representation of information related to the merchandise information, and provides for display the AR graphic 234 overlaid onto the live view 232 within the GUI 140 of the computing device 102 including the interactive graphical representation of information related to the merchandise information. FIG. 16 illustrates the interactive graphical representations including the best sellers 236 and the reviews 238. The interactive graphical representations further include instructions for the user to select an option to start the virtual experience.

Figure 17:
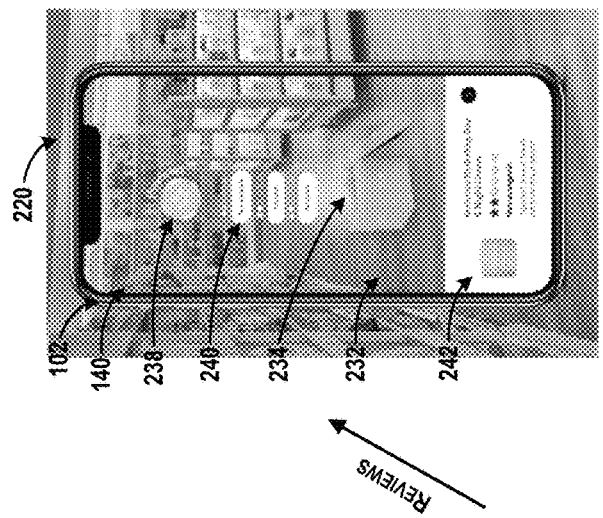
FIG. 17 illustrates a next stage of the virtual experience in which the user selected an item of the graphics, according to an example implementation.

FIG. 17 illustrates a next stage of the virtual experience in which the user selected an item of the AR graphic 234, which includes the reviews 238. For a topic of the item of the AR graphic 234 that is selected, the computing device accesses via the AI engine 122 data sources to identify retail information that is both (i) related to the merchandise information and (ii) determined to be related to information in a user profile for a user of the computing device 102. In this example, such information results in display of the 2D cards 240 as related to topics of reviews for the product and are overlaid onto the live view 232 of the GUI 140, and display of the product card 242 overlaid onto the live view 232 of the GUI 140 with further details and review of the product. As the user interacts further with the virtual experience, the computing device 102 dynamically modifies content and animation of the AR graphic 234 to customize the content and animation of the AR graphic for the user of the user profile using the retail information.

Figure 18:
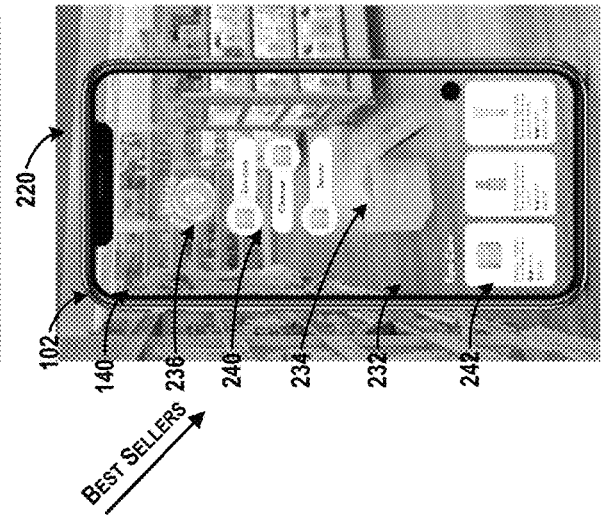
FIG. 18 illustrates a next stage of the virtual experience in which the user selected another item of the graphics, according to an example implementation.

FIG. 18 illustrates a next stage of the virtual experience in which the user selected an item of the AR graphic 234, which includes the best sellers 236. For a topic of the item of the AR graphic 234 that is selected, the computing device accesses via the AI engine 122 data sources to identify retail information that is both (i) related to the merchandise information and (ii) determined to be related to information in a user profile for a user of the computing device 102. In this example, such information results in display of the 2D cards 240 as related to topics of reviews for the product and are overlaid onto the live view 232 of the GUI 140, and display of the product card 242 overlaid onto the live view 232 of the GUI 140 with further details and review of the product. As the user interacts further with the virtual experience, the computing device 102 dynamically modifies content and animation of the AR graphic 234 to customize the content and animation of the AR graphic for the user of the user profile using the retail information.

In FIG. 18, further interaction with the best sellers 236 graphics results in display of the 2D cards 240 that list categories of products related to the captured merchandise information (e.g., serums, moisturizers, cleansers, etc.). Upon selection of one of the 2D cards, specific product card(s) 242 are display illustrating the best selling products within the selected category.

Figure 19:
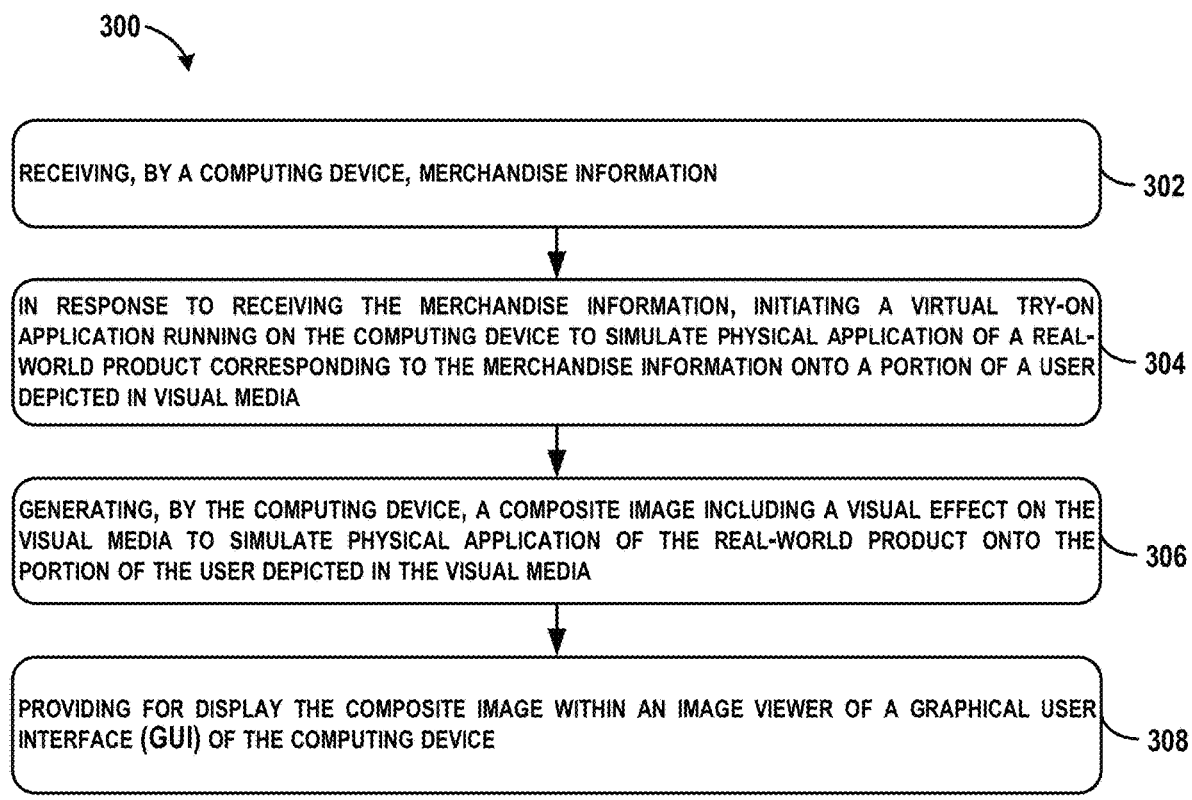
FIG. 19 is a flowchart illustrating an example of a computer-implemented method for providing a virtual experience, according to an example implementation.

FIG. 19 is a flowchart illustrating an example of a computer-implemented method 300 for providing a virtual experience, according to an example implementation. Method 300 shown in FIG. 19 presents an example of a method that could be used with the networked computer system 100, the client devices 102 and 104, and/or the host server device(s) 106 shown in FIG. 1 or with the virtual signage platform 130 shown in FIGS. 2-4, for example. Method 300 also presents an example of functions to be performed to generate outputs for display by the GUI 140, as shown in FIG. 11, for example.

Within examples, devices or systems described herein are used or configured to perform logical functions presented in FIG. 19. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 300 includes one or more operations, functions, or actions as illustrated by one or more of blocks 302-308. Although the blocks are illustrated in a sequential order, these blocks may also be performed in parallel, and/or in a different order than those described herein. In addition, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium includes non-transitory computer readable medium or memory, for example, such as computer-readable media that stores data for short periods of time like register memory, processor cache and Random Access Memory (RAM). The computer readable medium additionally or alternatively includes non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 19, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes receiving, by the computing device 102, merchandise information. In one example, receiving the merchandise information comprises receiving a machine readable label from the shopping display 222, and the machine readable label identifies an interactive graphical representation of information related to the real-world product. In another example, receiving the merchandise information comprises receiving an image including at least a portion of the real-world product, and performing object recognition of the real-world product within the image.

At block 304, the method 300 includes in response to receiving the merchandise information, initiating a virtual try-on application running on the computing device 102 to simulate physical application of a real-world product corresponding to the merchandise information onto a portion of a user depicted in visual media.

At block 306, the method 300 includes generating, by the computing device 102, a composite image including a visual effect on the visual media to simulate physical application of the real-world product onto the portion of the user depicted in the visual media.

At block 308, the method 300 includes providing for display the composite image within the image viewer 230 of the GUI 140 of the computing device 102. In one example, providing for display the composite image within the image viewer 230 of the GUI 140 of the computing device 102 comprises providing for display the composite image within a thumbnail image viewer of the GUI 140. In a further example, the method 300 includes receiving an input selecting the composite image in the thumbnail image viewer, and in response to receiving the input, switching display on the computing device 102 to the virtual try-on application including a full size display of the composite image.

In further examples, the method 300 includes in response to receiving the merchandise information: requesting, via the GUI 140, visual media including a face of the user, processing the visual media to perform matching of a cosmetic product to a physical characteristic of the user, and generating the composite image to include a second visual effect on the visual media to simulate physical application of the cosmetic product onto the face of the user. In an example, the computing device processes the visual media to perform shade matching of a cosmetic product to a characteristic of a user such as a color of nails, hair, eyebrow, beard, etc. in order to identify a matching cosmetic product for application as a second visual effect onto the user.

Within examples, the virtual try-on application is dynamic and a type of simulation offered for a second visual effect is based on a type of identified product or products determined to be related to the identified product. For example, when an identified product is a skin care product then a skin analysis is offered. Alternatively, if the identified product is a makeup product (e.g., foundation), then a shade matching is offered, such as performing an image analysis matching colors, tones, or shades of skin to a known color, tone, or shade of a product.

In the method 300, the real-world product is a first real-world product, and in further examples, the method 300 includes in response to receiving the merchandise information identifying a second real-world product based on a match to information of a profile of the user, and generating the composite image to include a second visual effect on the visual media to simulate physical application of the second real-world product onto the portion of the user depicted in the visual media.

In further examples, the method 300 includes in response to receiving the merchandise information, retrieving an interactive graphical representation of information related to the real-world product, and providing for display the AR graphic 234 within the GUI 140 including the interactive graphical representation of information related to the real-world product.

In an example, the GUI 140 includes the live view 232, and the method 300 further includes providing for display the AR graphic 234 overlaid onto the live view 232 including an interactive graphical representation of information related to the real-world product. In an example, the method 300 further includes receiving a selection of an item of the AR graphic 234, and for a topic of the item of the AR graphic 234 that is selected, accessing via the AI engine 122 data sources to identify retail information that is both (i) related to the merchandise information and (ii) determined to be related to information in a user profile for a user of the computing device 102, and dynamically modifying content and animation of the AR graphic to customize the content and animation of the AR graphic 234 for the user of the user profile using the retail information.

In further examples, the method 300 includes providing for display the AR graphic 234 overlaid onto the live view 232 within the GUI 140 of the computing device 102 and positioned to be anchored to a physical location of the first real-world product in the live view 232.

In further examples, the method 300 includes determining whether product definition data for the real-world product is available, where the product definition data includes a selection of filters from a group of filters which when applied in combination result in generation of the visual effect on the visual media to simulate physical application of the real-world product onto the portion of the user depicted in the visual media, and based on the product definition data for the real-world product being unavailable, initiating the virtual try-on application running on the computing device 102 to simulate physical application of an alternate real-world product corresponding to the merchandise information onto the portion of the user depicted in the visual media. In this example, when a digital version of the real-world product is not available for use for simulation, a closely related alternate product is utilized for which a digital version exists.

In some examples, the method 300 for a virtual experience, which is triggered to be performed by receipt of merchandise information, has yet further constraints to be satisfied prior to being performed. In an example, the method 300 includes determining a location of the computing device 102, and the merchandise information that is received is positioned proximal in the location of the computing device 102. Then, in response to the location of the computing device 102 being within a geographic-enabled zone for the real-world product, the method 300 includes initiating the virtual try-on application running on the computing device 102 to simulate physical application of the real-world product corresponding to the merchandise information onto the portion of the user depicted in the visual media. In this example, a promotion may be held in specific retail establishments at specific geographic locations, and QR codes on shopping displays in those locations can be enabled to initiate the virtual experience in a different manner than default resulting in a customized experience based on the promotion. As a specific example, a celebrity may be present in a specific location of a retail establishment, and QR codes on shopping displays in that retail establishment can be enabled to initiate a virtual experience including influences of the celebrity, such as products promoted by the celebrity, hairstyles worn by the celebrity, music by the celebrity, etc. Thus, the computing device 102, when present in that specific location, will be presented with a different virtual experience based on capturing the merchandise information on a shopping display than when present in another specific location and capturing the same merchandise information on a shopping display.

Figure 20:
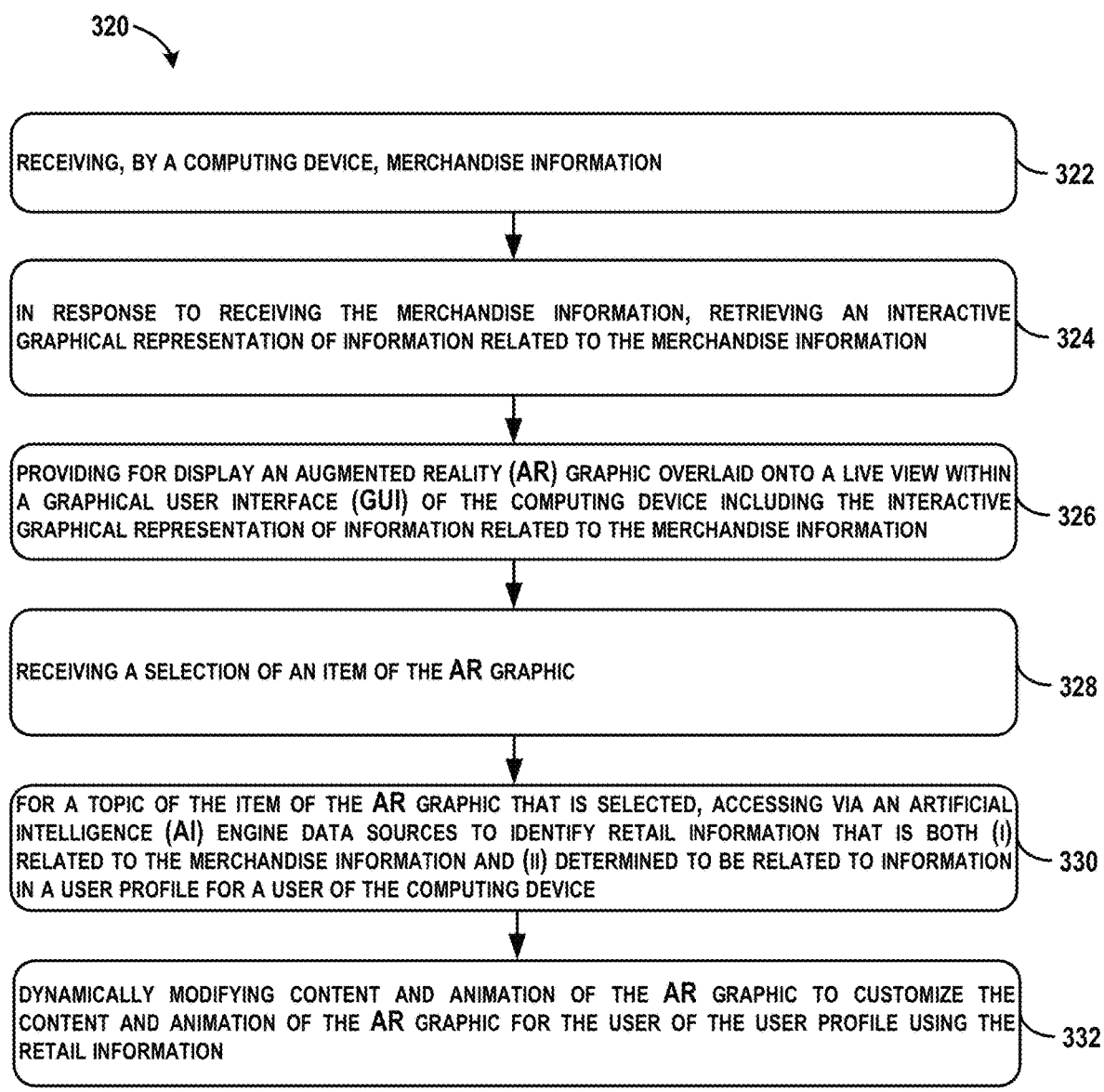
FIG. 20 is a flowchart illustrating another example of a computer-implemented method for providing a virtual experience, according to an example implementation.

FIG. 20 is a flowchart illustrating another example of a computer-implemented method 320 for providing a virtual experience, according to an example implementation. Method 320 shown in FIG. 20 presents an example of a method that could be used with the networked computer system 100, the client devices 102 and 104, and/or the host server device(s) 106 shown in FIG. 1 or with the virtual signage platform 130 shown in FIGS. 2-4, for example. Method 320 also presents an example of functions to be performed to generate outputs for display by the GUI 140, as shown in FIGS. 15-18.

At block 322, the method 320 includes receiving, by the computing device 102, merchandise information. In some examples, receiving the merchandise information includes receiving a product identifier, receiving a brand identifier, receiving information for a grouping of products, and/or receiving information for a category of products. The computing device 102 is operated to use the image capture device 132 to receive the merchandise information.

At block 324, the method 320 includes in response to receiving the merchandise information, retrieving an interactive graphical representation of information related to the merchandise information. In one example, the interactive graphical representation of information is related to a first real-world product corresponding to the merchandise information.

At block 326, the method 320 includes providing for display the AR graphic 234 overlaid onto the live view 232 within the GUI 140 of the computing device 102 including the interactive graphical representation of information related to the merchandise information. In one example, the merchandise information is receiving by capturing or receiving an image including at least a portion of a first real-world product, and the AR graphic 234 is displayed onto the live view 232 and positioned to be anchored to a physical location of the first real-world product in the live view 232.

In one example, the method 320 includes based on the merchandise information being a product, retrieving information related to reviews of the product. In another example, the method 320 includes based on the merchandise information being a brand, retrieving information related to products offered by the brand. Any and all information retrieved can be presented for display with the interactive graphics, for example.

At block 328, the method 320 includes receiving a selection of an item of the AR graphic 234.

At block 330, the method 320 includes for a topic of the item of the AR graphic 234 that is selected, accessing via the AI engine 122 data sources to identify retail information that is both (i) related to the merchandise information and (ii) determined to be related to information in a user profile for a user of the computing device 102.

At block 332, the method 320 includes dynamically modifying content and animation of the AR graphic 234 to customize the content and animation of the AR graphic 234 for the user of the user profile using the retail information.

The method 320 thus provides dynamic content based on specific customizations for the user. Customizations can include custom color graphics in the GUI 140, which are influenced by what the user likes, such as by referencing calibration data and analytics of the kind of makeup shades viewed by the user or selected for virtual try-on in the virtual try-on application.

In some examples, the method 320 further includes in response to receiving the merchandise information, initiating a virtual try-on application running on the computing device 102 to simulate physical application of a first real-world product corresponding to the merchandise information onto a portion of the user depicted in visual media, generating by the computing device 102 a composite image including a visual effect on the visual media to simulate physical application of the first real-world product onto the portion of the user depicted in the visual media, and providing for display the composite image within an image viewer of the GUI of the computing device 102. Thus, the method 320 can be combined with the method 300, or aspects and functions of the method 320 can be combined with aspects and functions of the method 300.

Thus, in further examples, the method 320 includes in response to receiving the merchandise information: processing the visual media to perform shade matching of a makeup product to a color of skin of the face of the user, and generating the composite image to include a second visual effect on the visual media to simulate physical application of the makeup product onto the face of the user.

In yet further examples, the method 320 includes determining a location of the computing device 102, and in response to the location of the computing device 102 being within a geographic-enabled zone for the first real-world product, retrieving the interactive graphical representation of information related to the first real-world product corresponding to the merchandise information.

As another example, the method 320 includes determining a location of the computing device 102 within a store, such as to determine a department of the store, an aisle of the store, etc., and associating the location with corresponding merchandise information (i.e., indoor mapping, Bluetooth low energy (BLE), and GPS can be used for granular location determination). Following, the method 320 includes providing the AR graphic based on the corresponding merchandise information. In this example, when the computing device 102 is determined to be in a cosmetic department of a store, the AR graphic can be populated with cosmetic type merchandise information. Alternatively, when the computing device 102 is determined to be in a clothing department of the store, the AR graphic can be populated with clothing type merchandise information. Thus, content selected for use within the AR graphic can be based on many factors including a location of the client device 102 at a granular level within a store to distinguish between various departments of the store.

Figure 21:
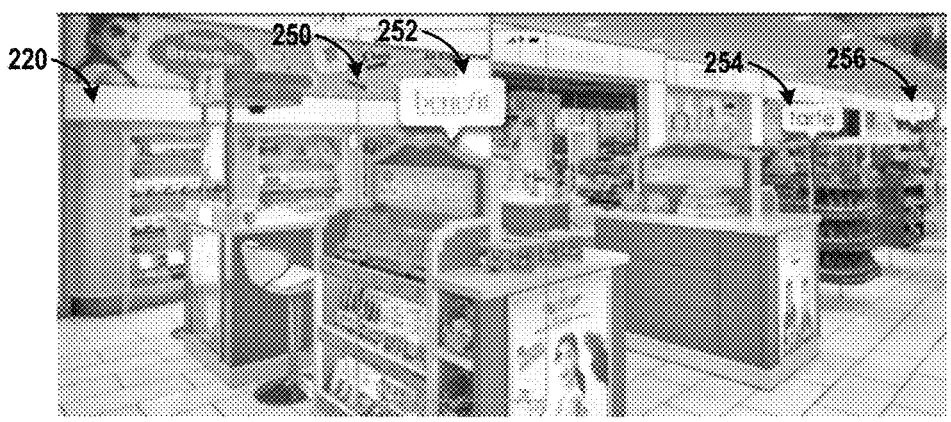
FIG. 21 is a conceptual illustration of a retail establishment including merchandise information to initiate a virtual experience, according to an example implementation.

FIGS. 21-24 are conceptual illustrations of a retail establishment 220 including merchandise information to initiate a virtual experience, according to example implementations. In FIG. 21, a field of view 250 of the computing device 102 is illustrated in an example in which the computing device 102 is operated to capture a live view of the retail establishment 220 using the image capture device 132. In one example, the computing device 102 receives merchandise information, such as receives a digital image of a product, a shopping display, a brand identifier, etc., from an image of the live view and initiates the virtual experience. In another example, a geographic location of the computing device 102 is determined and used as a basis to initiate the virtual experience, for example, based on the computing device 102 being located within the retail establishment 220.

The virtual experience includes generation and display of AR graphics, such as a brand graphic 252. The brand graphic 252 is attached to the shopping display on which products on the brand are located. In one example, the display of the brand graphic 252 is overlaid onto the live view and positioned to be anchored to a physical location of the real-world product in the live view for which the merchandise information was received. Thus, when the merchandise information includes an image of a product on the shopping display, the brand graphic 252 is overlaid onto the live view and is positioned to be anchored to the shopping display, as shown in FIG. 21. The brand graphic 252 will only be displayed on the computing device 102 as long as the field of view 250 of the computing device 102 includes the shopping display.

FIG. 21 illustrates additional brand graphics 254 and 256 for conceptual purposes to demonstrate that when the field of view 250 of the computing device 102 captures another live view of the retail establishment, then other the brand graphics 254 and 256 can be generated and displayed on the computing device 102. In operation, the user can operate the computing device 102 to scan many areas of the retail establishment 220 to identify many different brand graphics to identify all of the different virtual experiences offered by the retail establishment 220. As long as the field of view 250 of the computing device 102 includes a physical location, physical shopping display, or a physical real-world product to which an AR graphic is anchored in virtual space, then the computing device 102 retrieves and displays the corresponding AR graphic to enable the virtual experience for user consumption.

Figure 22:
FIG. 22 illustrates an example of the virtual experience being carried out, according to an example implementation.

FIG. 22 illustrates an example of the virtual experience being carried out, according to an example implementation. The brand graphic 252 is interactive, and upon receiving a selection of the brand graphic 252, the computing device 102 retrieves and displays information cards 258 for products of the brand that are included on the shopping display. The information cards 258 include details of the products, and a user can scroll through the information cards 258 to view alternate products.

Figure 23:
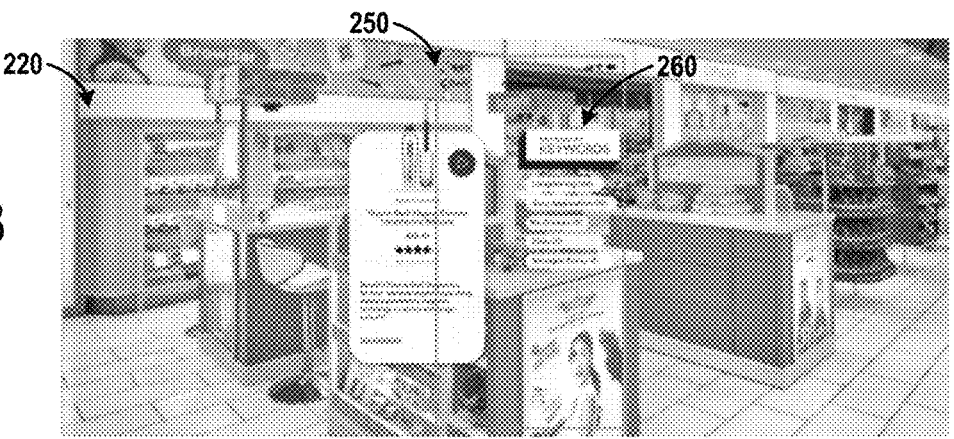
FIG. 23 illustrates an example of the virtual experience continuing to be carried out, according to an example implementation.

FIG. 23 illustrates an example of the virtual experience continuing to be carried out, according to an example implementation. Upon receiving a selection of an item of the information cards 258, the computing device 102 retrieves and displays topics 260 for the selected item, such as reviews of the product, best sellers listings, further details of the product, videos describing or showing use of the product, etc.

Figure 24:
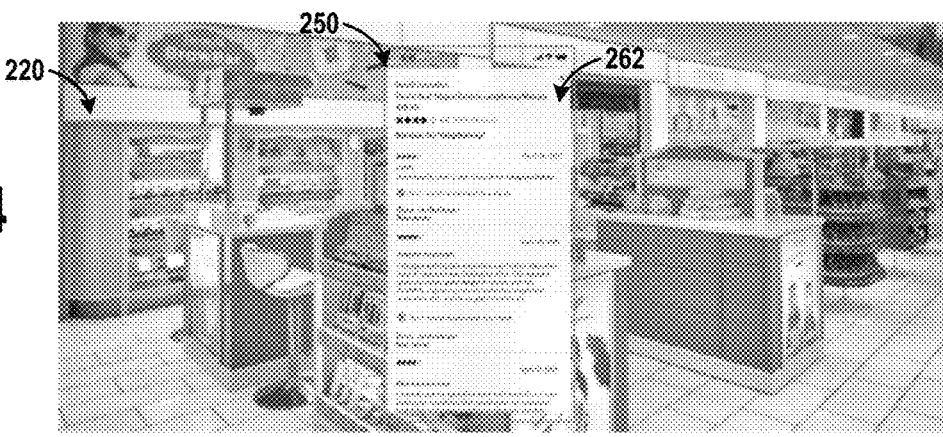
FIG. 24 illustrates an example of the virtual experience continuing to be carried out, according to an example implementation.

FIG. 24 illustrates an example of the virtual experience continuing to be carried out, according to an example implementation. Upon receiving a selection of one of the topics 260, the computing device 102 retrieves and displays details of the topic, such as specific reviews 262.

Figure 25:
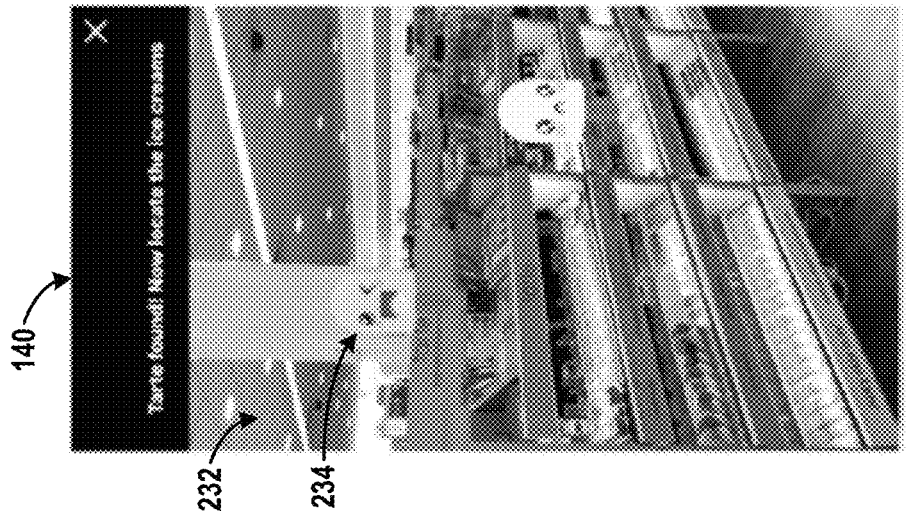
FIG. 25 is a conceptual illustration of the GUI of the computing device including merchandise information to initiate a virtual experience, according to an example implementation.
Figure 26:
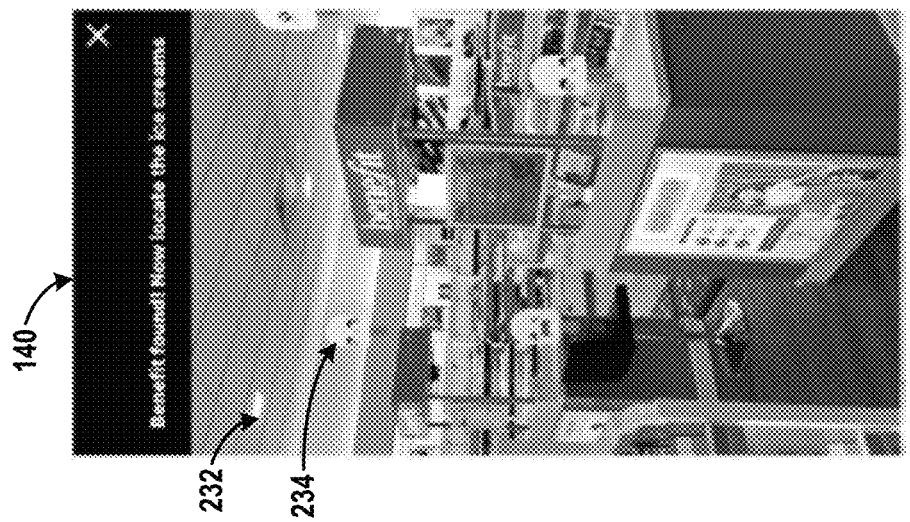
FIG. 26 is another conceptual illustration of the GUI 140 of the computing device 102 including merchandise information to initiate a virtual experience, according to an example implementation.
Figure 27:
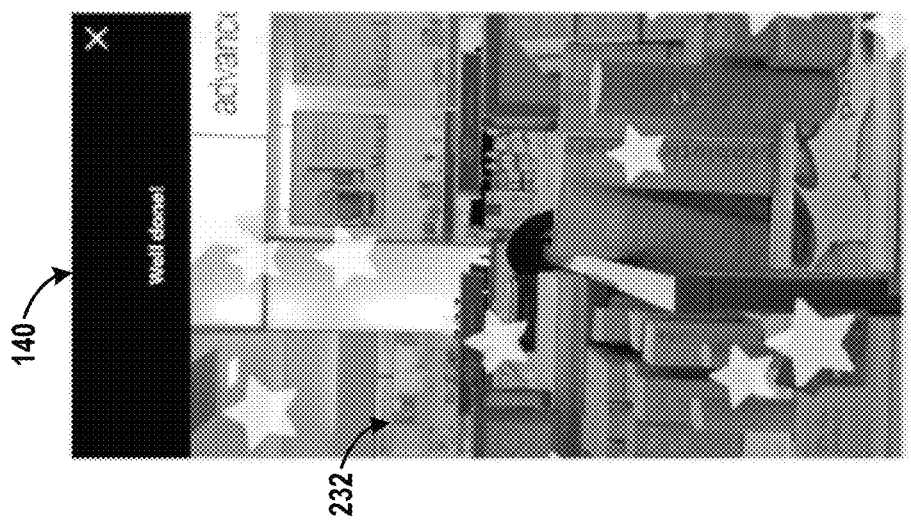
FIG. 27 is another conceptual illustration of the GUI 140 of the computing device 102 including merchandise information to initiate a virtual experience, according to an example implementation.

FIGS. 25-27 are conceptual illustrations of the GUI 140 of the computing device 102 including merchandise information to initiate a virtual experience, according to example implementations. In FIG. 25, the GUI 140 includes the live view 232 as well as AR graphic(s) 234. In FIG. 26, similarly, the GUI 140 includes the live view 232 as well as AR graphic(s) 234. Thus, as the computing device 102 is operated to scan different areas of the retail establishment, areas that include merchandise information to trigger a virtual experience or simply areas that include virtual experiences are designated by positioning of the AR graphic(s) 234 in the live view 232 of the GUI 140.

FIG. 27 illustrates an example of the virtual experience including animated digital graphics (e.g., stars), which in this example, indicates that a specific product has been found in the retail establishment.

Examples above describe implementations as methods performed by devices. In other examples, implementations take the form of a non-transitory computer-readable media having stored therein instructions, which when executed by a computing device having one or more processors causes the computing device to perform functions of the described methods.

In further examples, implementations take the form of a system comprising a computing device comprising one or more processors and non-transitory computer-readable media having stored therein instructions, which when executed by the one or more processors, causes the computing device to perform functions of the described methods.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described to explain the principles of the examples, the practical application, and to enable others of ordinary skill in the art to understand the disclosure for various examples with various modifications as are suited to the particular use contemplated.

Having described the subject matter of the present disclosure in detail and by reference to specific examples thereof, it is noted that the various details disclosed herein should not be taken to imply that these details relate to elements that are essential components of the various examples described herein, even in cases where a particular element is illustrated in each of the drawings that accompany the present description. Further, it will be apparent that modifications and variations are possible without departing from the scope of the present disclosure, including, but not limited to, examples defined in the appended claims. More specifically, although some aspects of the present disclosure are identified herein as preferred or particularly advantageous, it is contemplated that the present disclosure is not necessarily limited to these aspects.

Moreover, while some examples have been described in the context of fully functioning computers and computer systems, those skilled in the art will appreciate that various examples are capable of being distributed as a program product in a variety of forms, and that the disclosure applies equally regardless of a particular type of machine or computer-readable media used to effect the distribution.

Further examples of machine-readable storage media, machine-readable media, or computer-readable (storage)

media include, but are not limited to, recordable type media such as volatile and non-volatile memory devices, floppy and other removable drives, hard drives, optical disks (e.g., Compact Disk Read-Only Memory (CD ROMS), Digital Versatile Disks, (DVDs), etc.), among others, and transmission type media such as digital and analog communication links.

For the purposes of describing and defining examples herein, it is noted that terms "substantially" or "about" are utilized herein to represent an inherent degree of uncertainty attributed to any quantitative comparison, value, measurement, or other representation. The terms "substantially" and "about," when utilized herein, represent the degree by which a quantitative representation may vary from a stated reference without resulting in a change in a basic function of the subject matter at issue.

What is claimed is:

1. A computer-implemented method, comprising:
    receiving, by a computing device, merchandise information;
    in response to receiving the merchandise information, initiating a virtual try-on application running on the computing device to simulate physical application of a real-world product corresponding to the merchandise information onto a portion of a user depicted in visual media;
    generating, by the computing device, a composite image including a visual effect on the visual media to simulate physical application of the real-world product onto the portion of the user depicted in the visual media;
    providing for display the composite image within an image viewer of a graphical user interface (GUI) of the computing device;
    retrieving an interactive graphical representation of information related to the real-world product corresponding to the merchandise information;
    providing for display an augmented reality (AR) graphic overlaid onto a live view and positioned to be anchored to a physical location of the real-world product in the live view within the GUI of the computing device including the interactive graphical representation of information related to the real-world product;
    receiving a selection of an item of the AR graphic;
    for a topic of the item of the AR graphic that is selected, accessing via an artificial intelligence (AI) engine data sources to identify retail information that is both (i) related to the merchandise information and (ii) determined to be related to information in a user profile for a user of the computing device; and
    dynamically modifying content and animation of the AR graphic being display overlaid onto the live view within the GUI of the computing device to customize the content and animation of the AR graphic for the user of the user profile using the retail information.

2. The method of claim 1, wherein receiving the merchandise information comprises receiving a machine readable label from a shopping display, wherein the machine readable label identifies an interactive graphical representation of information related to the real-world product.

3. The method of claim 1, wherein receiving the merchandise information comprises:
    receiving an image including at least a portion of the real-world product; and
    performing object recognition of the real-world product within the image.

4. The method of claim 1, further comprising:
    in response to receiving the merchandise information:
        requesting, via the GUI, visual media including a face of the user;
        processing the visual media to perform matching of a cosmetic product to a physical characteristic of the user; and
        generating the composite image to include a second visual effect on the visual media to simulate physical application of the cosmetic product onto the face of the user.

5. The method of claim 1, wherein the real-world product is a first real-world product and the method further comprising:
    in response to receiving the merchandise information:
        identifying a second real-world product based on a match to information of a profile of the user; and
        generating the composite image to include a second visual effect on the visual media to simulate physical application of the second real-world product onto the portion of the user depicted in the visual media.

6. The method of claim 1, further comprising:
    determining a location of the computing device, wherein the merchandise information that is received is proximal in the location of the computing device; and
    in response to the location of the computing device being within a geographic-enabled zone for the real-world product, initiating the virtual try-on application running on the computing device to simulate physical application of the real-world product corresponding to the merchandise information onto the portion of the user depicted in the visual media.

7. The method of claim 1, further comprising:
    determining whether product definition data for the real-world product is available, wherein the product definition data includes a selection of filters from a group of filters which when applied in combination result in generation of the visual effect on the visual media to simulate physical application of the real-world product onto the portion of the user depicted in the visual media; and
    based on the product definition data for the real-world product being unavailable, initiating the virtual try-on application running on the computing device to simulate physical application of an alternate real-world product corresponding to the merchandise information onto the portion of the user depicted in the visual media.

8. The method of claim 1, wherein providing for display the composite image within the image viewer of the GUI of the computing device comprises providing for display the composite image within a thumbnail image viewer of the GUI.

9. The method of claim 8, further comprising:
    receiving an input selecting the composite image in the thumbnail image viewer; and
    in response to receiving the input, switching display on the computing device to the virtual try-on application including a full size display of the composite image.

10. The method of claim 1, wherein the GUI includes a live view, and the method further comprises:
    providing for display an augmented reality (AR) graphic overlaid onto the live view including an interactive graphical representation of information related to the real-world product.

11. The method of claim 1, further comprising positioning the AR graphic to be anchored to the physical location of the first real-world product in the live view using line and plane detection of objects in the image.

12. A computer-implemented method, comprising:
receiving, by a computing device, merchandise information including an image of at least a portion of a first real-world product;
in response to receiving the merchandise information, retrieving an interactive graphical representation of information related to the merchandise information;
providing for display an augmented reality (AR) graphic overlaid onto a live view and positioned to be anchored to a physical location of the first real-world product in the live view within a graphical user interface (GUI) of the computing device including the interactive graphical representation of information related to the merchandise information;
receiving a selection of an item of the AR graphic;
for a topic of the item of the AR graphic that is selected, accessing via an artificial intelligence (AI) engine data sources to identify retail information that is both (i) related to the merchandise information and (ii) determined to be related to information in a user profile for a user of the computing device; and
dynamically modifying content and animation of the AR graphic being displayed overlaid onto the live view within the GUI of the computing device to customize the content and animation of the AR graphic for the user of the user profile using the retail information.

13. The method of claim 12, wherein receiving the merchandise information comprises receiving a product identifier.

14. The method of claim 12, wherein receiving the merchandise information comprises receiving a brand identifier.

15. The method of claim 12, wherein receiving the merchandise information comprises receiving information for a grouping of products.

16. The method of claim 12, wherein receiving the merchandise information comprises receiving information for a category of products.

17. The method of claim 12, wherein retrieving the interactive graphical representation of information related to the merchandise information comprises retrieving the interactive graphical representation of information related to the first real-world product corresponding to the merchandise information.

18. The method of claim 17, further comprising:
determining a location of the computing device; and
in response to the location of the computing device being within a geographic-enabled zone for the first real-world product, retrieving the interactive graphical representation of information related to the first real-world product corresponding to the merchandise information.

19. The method of claim 12, further comprising:
based on the merchandise information being the first real-world product, retrieving information related to reviews of the product; and
based on the merchandise information being a brand, retrieving information related to products offered by the brand.

20. The method of claim 12, further comprising:
in response to receiving the merchandise information, initiating a virtual try-on application running on the computing device to simulate physical application of the first real-world product corresponding to the merchandise information onto a portion of the user depicted in visual media;
generating, by the computing device, a composite image including a visual effect on the visual media to simulate physical application of the first real-world product onto the portion of the user depicted in the visual media; and
providing for display the composite image within an image viewer of the GUI of the computing device.

21. The method of claim 20, further comprising:
in response to receiving the merchandise information:
processing the visual media to perform shade matching of a makeup product to a color of skin of the face of the user; and
generating the composite image to include a second visual effect on the visual media to simulate physical application of the makeup product onto the face of the user.

22. The method of claim 12, further comprising positioning the AR graphic to be anchored to the physical location of the first real-world product in the live view using a simultaneous localization and mapping (SLAM) algorithm.

23. The method of claim 12, further comprising positioning the AR graphic to be anchored to the physical location of the first real-world product in the live view using line and plane detection of objects in the image.

24. A system comprising:
a computing device comprising one or more processors and non-transitory computer- readable media having stored therein instructions, which when executed by the one or more processors, causes the computing device to perform functions comprising:
receiving merchandise information including an image of at least a portion of a first real-world product;
in response to receiving the merchandise information, retrieving an interactive graphical representation of information related to the merchandise information;
providing for display an augmented reality (AR) graphic overlaid onto a live view and positioned to be anchored to a physical location of the first real-world product in the live view within a graphical user interface (GUI) of the computing device including the interactive graphical representation of information related to the merchandise information;
receiving a selection of an item of the AR graphic;
for a topic of the item of the AR graphic that is selected, accessing via an artificial intelligence (AI) engine data sources to identify retail information that is both (i) related to the merchandise information and (ii) determined to be related to information in a user profile for a user of the computing device; and
dynamically modifying content and animation of the AR graphic being displayed overlaid onto the live view within the GUI of the computing device to customize the content and animation of the AR graphic for the user of the user profile using the retail information.

25. The system of claim 24, wherein the functions further comprise positioning the AR graphic to be anchored to the physical location of the first real-world product in the live view using line and plane detection of objects in the image.

* * * * *